(12) United States Patent
Mallon et al.

(10) Patent No.: US 8,681,224 B2
(45) Date of Patent: Mar. 25, 2014

(54) METHOD FOR HIGH PRECISION LENS DISTORTION CALIBRATION AND REMOVAL

(75) Inventors: John Mallon, Longford (IE); Paul F. Whelan, Dublin (IE)

(73) Assignee: Dublin City University, Dublin (IE)

( * ) Notice: Subject to any disclaimer, the term of this patent is extended or adjusted under 35 U.S.C. 154(b) by 422 days.

(21) Appl. No.: 12/666,178

(22) PCT Filed: Jun. 26, 2008

(86) PCT No.: PCT/EP2008/058219
§ 371 (c)(1),
(2), (4) Date: Nov. 15, 2011

(87) PCT Pub. No.: WO2009/000906
PCT Pub. Date: Dec. 31, 2008

(65) Prior Publication Data
US 2012/0057053 A1    Mar. 8, 2012

Related U.S. Application Data

(60) Provisional application No. 60/946,268, filed on Jun. 26, 2007.

(51) Int. Cl.
*H04N 17/00*   (2006.01)
*H04N 17/02*   (2006.01)
*H04N 5/225*   (2006.01)
*G01B 9/00*    (2006.01)
*G03B 21/26*   (2006.01)

(52) U.S. Cl.
USPC ........... 348/187; 348/180; 348/188; 348/335; 356/124; 353/34

(58) Field of Classification Search
USPC .............. 348/180, 187, 188, 222.1, 335, 241; 353/34; 356/124
See application file for complete search history.

(56) References Cited

U.S. PATENT DOCUMENTS

| | | | |
|---|---|---|---|
| 5,283,600 A * | 2/1994 | Imai | 353/34 |
| 6,002,525 A | 12/1999 | Poulo et al. | 359/642 |
| 6,919,927 B1 * | 7/2005 | Hyodo | 348/333.02 |
| 2002/0057345 A1 * | 5/2002 | Tamaki et al. | 348/207 |

(Continued)

FOREIGN PATENT DOCUMENTS

| | | |
|---|---|---|
| EP | 0 895 189 B1 | 10/2003 |
| EP | 0895189 | 10/2003 |

(Continued)

OTHER PUBLICATIONS

International Preliminary Report on Patentability, issued Jan. 5, 2010, for PCT/EP2008/058219, 8 pages.

(Continued)

*Primary Examiner* — Nhan T Tran
*Assistant Examiner* — Xi Wang
(74) *Attorney, Agent, or Firm* — Seed IP Law Group PLLC

(57) ABSTRACT

The present application relates to a high precision method for calibrating and removing distortion from a lens, and more particularly, a method for calibrating and removing distortion by arranging sensor readings to compensate for its presence and simultaneously optimize the resulting image magnification for best image quality.

20 Claims, 26 Drawing Sheets

(56) References Cited

U.S. PATENT DOCUMENTS

| | | | |
|---|---|---|---|
| 2003/0141433 A1 | 7/2003 | Gordon | 250/208.1 |
| 2003/0197124 A1* | 10/2003 | Wood | 250/332 |
| 2003/0222984 A1* | 12/2003 | Zhang | 348/187 |
| 2004/0212680 A1 | 10/2004 | Schroeder et al. | 348/188 |
| 2005/0007477 A1* | 1/2005 | Ahiska | 348/335 |
| 2005/0018175 A1* | 1/2005 | Cheng | 356/124 |
| 2005/0185049 A1* | 8/2005 | Iwai et al. | 348/47 |
| 2007/0115457 A1* | 5/2007 | Matsuzawa et al. | 356/124 |

FOREIGN PATENT DOCUMENTS

| | | |
|---|---|---|
| EP | 1 785 714 A2 | 5/2007 |
| EP | 1785714 | 5/2007 |
| GB | 2 380 887 A | 4/2003 |
| GB | 2380887 | 4/2003 |
| WO | 98/21690 | 5/1998 |
| WO | 98/21690 A1 | 5/1998 |
| WO | 03/043308 A2 | 5/2003 |

OTHER PUBLICATIONS

International Search Report, mailed Oct. 28, 2008, for PCT/EP2008/058219, 4 pages.

Jin et al., "Novel Calibration and Lens Distortion Correction of 3D Reconstruction Systems," *Journal of Physics: Conference Series* 48:359-363, 2006.

Written Opinion, mailed Oct. 28, 2008, for PCT/EP2008/058219, 9 pages.

Ahmed et al., "Differential Methods for Nonmetric Calibration of Camera Lens Distortion," *IEEE Transactions on Image Processing* 14(8):1215-1230, Aug. 2005.

Asari et al., "A New Approach for Nonlinear Distortion Correction in Endoscopic Images Based on Least Squares Estimation," *IEEE Transactions on Medical Imaging* 18(4):345-354, Apr. 1999.

Barreto et al., "Wide Area Multiple Camera Calibration and Estimation of Radial Distortion," *Workshop on Omnidirectional Vision and Camera Networks*, Prague, Czech Rep., 2004, 12 pages.

Bräuer-Burchardt et al., "A New Algorithm to Correct Fish-Eye- and Strong Wide-Angle-Lens-Distortion From Single Images," *2001 International Conference on Image Processing* 1:225-228, 2001.

Brown, "Close-Range Camera Calibration," *Photogrammetric Engineering*, pp. 855-866, 1971.

Clarke et al., "The Development of Camera Calibration Methods and Models," *Photogrammetric Record* 16(90):51-66, 1998.

Devernay et al., "Straight Lines Have to Be Straight," *Machine Vision and Applications* 13(1):14-24, 2001.

Farid et al., "Blind removal of lens distortion," *J. Opt. Soc. Am.* 18(9):2072-2078, Sep. 2001.

Fitzgibbon, "Simultaneous linear estimation of multiple view geometry and lens distortion," *Proceeding of the 2001 IEEE Computer Society Conference on Computer Vision and Pattern Recognition* 1:I-125-I-132, 2001.

Fryer et al., "Lens Distortion for Close-Range Photogrammetry," *Photogrammetric Engineering and Remote Sensing* 52(1):51-58, Jan. 1986.

Haneishi et al., "A New Method for Distortion Correction of Electronic Endoscope Images," *IEEE Transactions on Medical Imaging* 14(3):548-555, Sep. 1995.

Heikkilä et al., "A Four-step Camera Calibration Procedure with Implicit Image Correction," *1997 IEEE Computer Society Conference on Computer Vision and Pattern Recognition*, pp. 1106-1112, Jun. 17-19, 1997.

Heikkilä, "Geometric Camera Calibration Using Circular Control Points," *IEEE Transactions on Pattern Analysis and Machine Intelligence* 22(10):1066-1077, Oct. 2000.

International Search Report and Written Opinion of the International Searching Authority for International Application No. PCT/EP2008/058219, mailed on Oct. 28, 2008, 16 pages.

Lu et al., "Noisy Image Segmentation by Modified Snake Model," *Journal of Physics: Conference Series* 48:369-372, 2006.

Lucchese et al., "Correction of Geometric Lens Distortion Through Image Warping," *Proceedings of the 3rd International Symposium on Image and Signal Processing and Analysis*, pp. 516-521, 2003.

Mičušík et al., "Estimation of omnidirectional camera model from epipolar geometry," *Proceedings of the 2003 IEEE Computer Society Conference on Computer Vision and Pattern Recognition*, 2003, 6 pages.

Prescott et al., "Line-Based Correction of Radial Lens Distortion," *Graphical Models and Image Processing* 59(1):39-47, Jan. 1997.

Sawhney et al., "True Multi-Image Alignment and Its Application to Mosaicing and Lens Distortion Correction," *IEEE Transactions on Pattern Analysis and Machine Intelligence* 21(3):235-243, Mar. 1999.

Stein, "Lens Distortion Calibration using Point Correspondences," *1997 IEEE Computer Society Conference on Computer Vision and Pattern Recognition*, pp. 602-608, Jun. 17-19, 1997.

Sturm et al., "On Plane-Based Camera Calibration: A General Algorithm, Singularities, Applications," *IEEE Conference on Computer Vision and Pattern Recognition*, pp. 432-437, 1999.

Swaminathan et al, "Nonmetric Calibration of Wide-Angle Lenses and Polycameras," *IEEE Transactions on Pattern Analysis and Machine Intelligence* 22(10):1172-1178, Oct. 2000.

Tamaki et al., "Correcting Distortion of Image by Image Registration," *The 5th Asian Conference on Computer Vision*, Jan. 23-25, 2002, Melbourne, Australia, 6 pages.

Tsai, "A Versatile Camera Calibration Technique for High-Accuracy 3D Machine Vision Metrology Using Off-the-Shelf TV Cameras and Lenses," *IEEE Journal of Robotics and Automation*, vol. RA-3(4):323-344, Aug. 1987.

Wei et al., "Implicit and Explicit Camera Calibration: Theory and Experiments," *IEEE Transactions on Pattern Analysis and Machine Intelligence* 16(5):469-480, May 1994.

Weng et al., "Camera Calibration with Distortion Models and Accuracy Evaluation," *IEEE Transactions on Pattern Analysis and Machine Intelligence* 14(10):965-980, Oct. 1992.

Yu, "Image-based lens geometric distortion correction using minimization of average bicoherence index," *Pattern Recognition* 37:1175-1187, 2004.

Zhang, "On the Epipolar Geometry Between Two Images With Lens Distortion," *Proceedings of the 13th International Conference on Pattern Recognition* 1:407-411, Aug. 25-29, 1996.

Zhang, "A Flexible New Technique for Camera Calibration," *IEEE Transactions on Pattern Analysis and Machine Intelligence* 22(11):1330-1334, 2000.

Zhang, "A Flexible New Technique for Camera Calibration: Technical Report, MSR-TR-98-71," Microsoft Research, Microsoft Corporation, Redmond, WA, Dec. 2, 1998, last updated on Dec. 5, 2009, 22 pages.

* cited by examiner

FIGURE 3

| Criteria | Method 1 | Method 2 | Method 3 | Method 4 |
|---|---|---|---|---|
| # of Views | 1 | Multi | Multi | 1 |
| View Data | Planar | Planar | Planar | Line |
| Solution | Closed | Numerical | Numerical | Numerical |
| Dist. Model | Forward | Forward | Reverse | Reverse |
| Cam. Cal. | $X$ | √ | √ | $X$ |
| Param. SD | √ | $X$ | √ | √ |
| Online | - | √ | √ | $X$ |

FIGURE 4

| $k_1/\sigma^2$ | 0 | 0.2 | 0.4 | 0.6 | 0.8 | 1 |
|---|---|---|---|---|---|---|
| 0 | 0 (0) | 0.2358 (0.2202) | 0.5061 (0.4798) | 0.8739 (0.8051) | 1.5543 (1.0397) | 2.3643 (1.4354) |
| -0.2 | 0.0004 (0.0007) | 0.2207 (0.1993) | 0.4007 (0.3500) | 0.6144 (0.5485) | 0.9469 (0.8381) | 1.0401 (0.9469) |
| -0.4 | 0.0033 (0.0057) | 0.2039 (0.1715) | 0.4246 (0.3671) | 0.6096 (0.5305) | 0.7837 (0.7404) | 1.0038 (0.9216) |
| -0.6 | 0.0113 (0.0196) | 0.1773 (0.1591) | 0.3546 (0.3709) | 0.5482 (0.5126) | 0.7843 (0.7370) | 0.9144 (0.8469) |
| -0.8 | 0.0263 (0.0466) | 0.1848 (0.1855) | 0.3558 (0.3197) | 0.5494 (0.5390) | 0.7712 (0.6792) | 0.8102 (0.8446) |
| -1 | 0.0499 (0.0901) | 0.1833 (0.1913) | 0.3257 (0.3662) | 0.5350 (0.5250) | 0.7027 (0.6526) | 0.8904 (0.8558) |
| -1.2 | 0.0826 (0.1530) | 0.1803 (0.2138) | 0.3262 (0.3651) | 0.4948 (0.5114) | 0.6774 (0.6311) | 0.7748 (0.8862) |
| -1.4 | 0.1248 (0.2372) | 0.1821 (0.2901) | 0.3137 (0.3756) | 0.483 (0.4655) | 0.6680 (0.6826) | 0.7415 (0.8500) |
| -1.6 | 0.1762 (0.3445) | 0.2234 (0.3605) | 0.3437 (0.4360) | 0.4798 (0.5407) | 0.6200 (0.7346) | 0.7337 (0.8322) |
| -1.8 | 0.2361 (0.4759) | 0.2687 (0.5049) | 0.3326 (0.4851) | 0.4739 (0.6025) | 0.5936 (0.7165) | 0.7481 (0.8524) |

FIGURE 5

| $K_I/\sigma^2$ | 0 | 0.2 | 0.4 | 0.6 | 0.8 | 1 |
|---|---|---|---|---|---|---|
| 0 | 0.0025 (0.0016) | 0.1526 (0.1198) | 0.3297 (0.2589) | 0.5066 (0.3979) | 0.7312 (0.5524) | 0.8521 (0.6454) |
| -0.2 | 0.1121 (0.0785) | 0.1815 (0.147) | 0.2912 (0.234) | 0.4473 (0.3451) | 0.575 (0.4306) | 0.7237 (0.5438) |
| -0.4 | 0.4181 (0.2926) | 0.4264 (0.3242) | 0.4594 (0.3658) | 0.5329 (0.4435) | 0.6743 (0.5251) | 0.7927 (0.6187) |
| -0.6 | 0.8721 (0.6176) | 0.8904 (0.6345) | 0.8861 (0.6883) | 0.925 (0.724) | 0.9884 (0.7998) | 0.9729 (0.7942) |
| -0.8 | 1.4332 (1.0378) | 1.4383 (1.0536) | 1.4341 (1.0654) | 1.4801 (1.096) | 1.4469 (1.1413) | 1.4627 (1.1953) |
| -1 | 2.0662 (1.5455) | 2.0657 (1.5471) | 2.0639 (1.5758) | 2.0765 (1.614) | 2.0903 (1.6185) | 2.0906 (1.6943) |
| -1.2 | 2.7427 (2.1389) | 2.7477 (2.1405) | 2.7282 (2.1498) | 2.7617 (2.2101) | 2.7334 (2.1747) | 2.7651 (2.2068) |
| -1.4 | 3.4406 (2.8204) | 3.4373 (2.8374) | 3.4266 (2.8337) | 3.4349 (2.84) | 3.4473 (2.8369) | 3.4424 (2.8875) |
| -1.6 | 4.143 (3.5953) | 4.1414 (3.5914) | 4.1349 (3.5985) | 4.1594 (3.6123) | 4.1526 (3.629) | 4.1353 (3.6114) |
| -1.8 | 4.8384 (4.47) | 4.8398 (4.4729) | 4.8404 (4.4859) | 4.8372 (4.4832) | 4.8528 (4.4594) | 4.8579 (4.5038) |
| -2 | 5.336 (6.7399) | 5.3365 (6.7389) | 5.3557 (6.7436) | 5.3478 (6.7374) | 5.3728 (6.7714) | 5.3571 (6.7408) |

FIGURE 6

| $k_1/\sigma^2$ | 0 | 0.2 | 0.4 | 0.6 | 0.8 | 1 |
|---|---|---|---|---|---|---|
| 0 | 0.1908 (0.1231) | 0.1919 (0.1468) | 0.2644 (0.2165) | 0.3791 (0.3083) | 0.4921 (0.3912) | 0.7031 (0.501) |
| -0.2 | 0.2701 (0.1806) | 0.2847 (0.229) | 0.3948 (0.3118) | 0.5356 (0.4345) | 0.6672 (0.5251) | 0.8367 (0.6663) |
| -0.4 | 0.8474 (0.5649) | 0.8419 (0.5923) | 0.8771 (0.6841) | 0.9321 (0.754) | 1.0319 (0.8708) | 1.1468 (0.9374) |
| -0.6 | 1.4005 (0.9605) | 1.3625 (0.969) | 1.3911 (1.0212) | 1.3634 (1.0931) | 1.38 (1.1461) | 1.5862 (1.3061) |
| -0.8 | 1.5987 (1.2166) | 1.5795 (1.2214) | 1.5728 (1.2878) | 1.4801 (1.3207) | 1.6442 (1.4604) | 1.6977 (1.4215) |
| -1 | 1.127 (1.2317) | 1.1225 (1.2612) | 1.1614 (1.281) | 1.2035 (1.3069) | 1.3363 (1.4139) | 1.5164 (1.4935) |
| -1.2 | 0.583 (0.948) | 0.6356 (0.9737) | 0.7598 (1.0423) | 0.9992 (1.5767) | 1.2612 (1.2694) | 1.4331 (1.327) |
| -1.4 | 3.0758 (1.2845) | 3.0391 (1.3077) | 3.0691 (1.3832) | 3.2173 (1.5767) | 3.3565 (1.7272) | 3.4087 (1.8816) |
| -1.6 | 7.2372 (2.9217) | 7.2639 (2.9396) | 7.3176 (3.0208) | 7.5021 (3.2005) | 7.4749 (3.3129) | 7.8262 (3.5051) |
| -1.8 | 13.2071 (5.4237) | 13.2457 (5.4568) | 13.2545 (5.4956) | 13.3984 (5.599) | 13.7115 (5.8024) | 13.8121 (6.0262) |
| -2 | 19.2323 (8.4785) | 19.2652 (8.5073) | 19.4367 (8.6819) | 19.522 (8.7784) | 19.6985 (9.048) | 19.9261 (9.2825) |

FIGURE 7

| $k_1/\sigma^2$ | 0 | 0.2 | 0.4 | 0.6 | 0.8 | 1 |
|---|---|---|---|---|---|---|
| 0 | 0.0841 (0.0343) | 55.4104 (9.1837) | nc | 26.7411 (6.019) | 128.5432 (15.6178) | nc |
| -0.2 | 1.4546 (0.5785) | 1.7232 (1.0687) | 2.5774 (1.8105) | 3.4364 (2.4439) | 5.3523 (3.7368) | 6.3437 (4.433) |
| -0.4 | 2.6048 (1.0238) | 2.478 (1.4911) | 3.5198 (2.2741) | 4.6648 (3.2089) | 6.1555 (4.4794) | 8.7572 (6.2686) |
| -0.6 | 3.7093 (1.4552) | 3.6468 (2.0818) | 4.0407 (2.7672) | 5.8312 (4.0605) | nc | nc |
| -0.8 | 4.9811 (1.9633) | 4.8992 (2.7498) | 12.1224 (11.0923) | 14.9092 (12.64) | 12.6745 (9.6749) | 38.743 (15.412) |
| -1 | 6.5494 (2.6018) | 55.4478 (52.3379) | 38.7723 (35.1774) | 29.9265 (26.8411) | nc | nc |
| -1.2 | 8.422 (3.3727) | 8.2952 (4.7627) | 9.4199 (6.9322) | 13.0092 (9.9833) | 17.7393 (13.4921) | 19.7825 (15.228) |
| -1.4 | 10.4553 (4.2195) | 10.0689 (5.2757) | 10.4045 (7.0633) | 11.1341 (8.1748) | nc | nc |
| -1.6 | 12.3429 (5.0315) | 11.7013 (5.5733) | 10.587 (6.9299) | 9.719 (6.9631) | 14.3564 (10.7096) | 15.7847 (12.1106) |
| -1.8 | 13.6184 (5.6291) | 12.8806 (5.8626) | 9.4004 (5.4976) | 8.837 (6.6854) | 10.8022 (8.1776) | 10.7765 (8.2311) |
| -2 | 12.4561 (5.4377) | 12.6685 (6.3563) | 13.6445 (7.9549) | 16.1739 (9.8614) | 20.3563 (12.8100) | 28.1754 (15.7858) |

FIGURE 8

| Sample | Camera | Resolution | M.1 | M.3 | M.4 |
|---|---|---|---|---|---|
| 1 | Fuji + WL-FX9 | 2832 x 2128 | 11 | 11 | 18 |
| 2 | Nikon E4500 + FC-E8 (FL 32mm) | 2272 x 1704 | 8 | 15 | 35 |
| 3 | Kodak Megaplus + 6mm Computar | 1312 x 1032 | 16 | 11 | 24 |
| 4 | Nikon E4500 + FC-E8 (FL 24mm) | 2272 x 1704 | 9 | 20 | 27 |
| 5 | Nikon E4500 + FC-E8 (FL 21.5mm) | 2272 x 1704 | 9 | 71 | 25 |
| 6 | Nikon E4500 + FC-E8 (FL 17.8mm) | 2272 x 1704 | 13 | nc | 24 |
| 7 | Nikon E4500 + FC-E8 (FL 14.6mm) | 2272 x 1704 | 15 | nc | 140 |

FIGURE 10

| Sample | Method 1 | Method 2 | Method 3 | Method 4 |
|---|---|---|---|---|
| 1 | 0.3164 (0.3362) | 0.4088 (0.3402) | 10.356 (8.6270) | 0.3667 (0.3111) |
| 2 | 0.4569 (0.3323) | 0.5868 (0.9809) | 0.9490 (0.7739) | 11.8077 (8.0165) |
| 3 | 0.2646 (0.2566) | 0.2673 (0.2650) | 0.4456 (0.4318) | 0.3121 (0.3217) |
| 4 | 0.5556 (0.7865) | 1.4319 (0.8993) | 16.4172 (8.7168) | 3.9692 (2.7197) |
| 5 | 0.8690 (0.6615) | 2.4142 (1.5129) | 21.724 (11.311) | 0.8294 (2.0553) |
| 6 | 1.8964 (1.6195) | 9.3508 (7.7634) | nc | 2.0041 (1.6612) |
| 7 | 4.6403 (3.5282) | 32.625 (26.973) | nc | 5.9567 (7.3236) |

FIGURE 11

| Sample | Method 1 | Method 2 |
|---|---|---|
| 1 | 0.3734 (0.3200) | 0.4088 (0.3402) |
| 2 | 0.3578 (0.2839) | 0.5868 (0.9809) |
| 3 | 0.2629 (0.2836) | 0.2673 (0.2650) |
| 4 | 1.5406 (1.0859) | 1.4319 (0.8993) |
| 5 | 2.6919 (1.9254) | 2.4142 (1.5129) |
| 6 | 7.6891 (6.8891) | 9.3508 (7.7634) |
| 7 | 16.535 (13.799) | 32.625 (26.973) |

FIGURE 23

| Sample | | Method 1 | Method 2 | Method 3 | Method 4 |
|---|---|---|---|---|---|
| 1 | x | 1374.7 (1.41) | 1382.0 | 1378.2 (0.72) | 1360.8 (3.21) |
|   | y | 1063.2 (1.01) | 1062.5 | 1052.3 (1.18) | 1065.3 (0.62) |
| 2 | x | 1100.2 (0.70) | 1107.6 | 1117.5 (0.91) | 693.1 (25.1) |
|   | y | 887.8 (0.50) | 890.3 | 883.0 (0.89) | 910.8 (1.39) |
| 3 | x | 618.3 (1.52) | 618.2 | 615.6 (0.23) | 617.3 (0.493) |
|   | y | 501.0 (0.58) | 501.8 | 502.6 (0.22) | 503.1 (0.23) |
| 4 | x | 1113.3 (0.43) | 1115.7 | 1148.4 (2.75) | 1193.3 (9.06) |
|   | y | 879.7 (0.31) | 881.8 | 864.8 (3.29) | 883.4 (0.48) |
| 5 | x | 1114.3 (0.41) | 1115.4 | 1101.6 (3.45) | 1117.4 (5.39) |
|   | y | 878.1 (0.29) | 878.2 | 852.8 (427) | 878.5 (0.28) |
| 6 | x | 1117.6 (0.37) | 1134.3 | nc | 1129.7 (3.75) |
|   | y | 873.2 (0.26) | 870.1 | nc | 871.4 (0.28) |
| 7 | x | 1120.3 (0.34) | 1093.4 | nc | 1123.5 (1.81) |
|   | y | 873.1 (0.26) | 861.4 | nc | 873.2 (0.21) |

METHOD FOR HIGH PRECISION LENS DISTORTION CALIBRATION AND REMOVAL

CROSS-REFERENCE TO RELATED APPLICATIONS

This application is a U.S. national stage application filed under 35 U.S.C. §371 of International Patent Application PCT/EP2008/058219, accorded an international filing date of Jun. 26, 2008, which claims benefit under 35 U.S.C. 119(e) to U.S. provisional patent application Ser. No. 60/946,268, filed Jun. 26, 2007, and incorporates by reference the contents of these applications in their entirety.

FIELD OF THE INVENTION

The present invention relates to a high precision method for calibrating and removing distortion from a lens, and more particularly, a method for calibrating and removing distortion by arranging sensor readings to compensate for its presence and simultaneously optimize the resulting image magnification for best image quality.

BACKGROUND OF THE INVENTION

An optical instrument is generally required to produce a geometrically consistent image of a given object, where each point is imaged as a point in the image. The image is generally formed in accordance with some predefined imaging model, which in this case, is assumed to be a projective camera. The departure of practical optical systems from ideal behavior leads to the introduction of aberrations in the resulting images. The aberration here is lens distortion, a well known monochromatic aberration, which is present in both color and greyscale imaging devices. Its nature is predominantly a radial geometric displacement of pixels giving a barrel or a pincushion effect but without loss of image quality.

Lens distortion is a thorn in the side of many relatively straightforward image analysis tasks. It comprehensively degrades the accuracy of measurements made in real images, where pixels in a normal perspective camera can typically be displaced by up to ten percent of the image width.

One known method for addressing lens distortion is in conjunction with a complete calibration of the camera system. Complete camera calibration essentially means that the camera's internal and external parameters are obtained. Internal parameters roughly relate to the camera lens, such as focal length and optical axis. Lens distortion parameters may be considered as an add-on to the set of internal camera parameters. The external parameters relate to the positioning of the camera. Such conventional camera calibration methods are disclosed in many research papers. The importance of distortion in this regard has seen the utter dominance of these more complicated algorithms at the expense of those that do not consider distortion.

Despite this, many applications do not require the full complement of internal camera parameters and the relative orientation in relation to some calibration target. Non-metric applications differ in that they do not necessarily employ the lens or external characteristics in determining distortion.

In the 1960's Duane C. Brown, working in the area of photogrammetry, proposed a method for determining lens distortion based on the truism that straight lines must be imaged as straight lines. This technique, published in (Brown, 1971), and with extensions in (Fryer and Brown, 1986), became known as the 'plumb line' method, where initially fine white thread was stretched by plumb bobs which were stabilized in an oil bath. A comprehensive historical review is given in Clarke and Fryer (1998). This technique was adopted by the machine vision community where simplified versions of the plumb line method were presented, e.g. Prescott and McLean (1997b), (also as patent Prescott and McLean (1997a) XP000683415) Haneishi et al. (1995a) (also as patent Haneishi et al. (1995b) XP000527216) Poulo and Gorman (1999) U.S. Pat. No. 6,002,525 and Asari et al. (1999) all describe a similar truism based correction for the correction of distortion using images of co-linear points. Similarly, high level distortion is considered in Brauer-Burchardt and Voss (2001), however the real example shown, with a quoted residual distortion of ±0.7 pixels, resembles a quite benign distortion level. Since these methods only estimate distortion, they are sometimes referred to as non-metric calibration.

An intrinsic problem for the multiple line based methods is that it becomes intractable to form geometric relationships between a distorted line segment and its true projection. An alternating approach was employed, for example in Devernay and Faugeras (2001), Tzu-Hung (2003) and Bing (1999) EP0895189, which iteratively adjusts the distortion parameters in order to minimize the line fitting to the distorted line segments. No meaningful geometric relationship exists between this objective error and the distortion parameters, hence no analytical derivatives are available. This results in slow convergence and can become unstable for elevated distortion levels, unless special steps are taken, as in Swaminathan and Nayar (2000). In this non-metric approach Swaminathan and Nayar (2000) reformulated the objective function in distorted space instead of the usual undistorted space. This is done by performing a further search at each alternation to find the location of a point closest to the considered distorted point, but that lies exactly on the line fitted to the current undistorted point estimates. The reported results showed improved robustness to noise for simulated data but no meaningful performance was reported in the real case.

Another approach has been suggested in Ahmed and Farag (2001) where the curvature of detected lines are used to estimate the parameters of the derivative distortion equation. However, the simulation results showed abysmal performance in the presence of noise, while the real results lacked a qualitative evaluation.

A more standard means of calibrating distortion is with the simultaneous estimation of a camera's extrinsic and intrinsic parameters. Tsai's method (Tsai, 1987) involves simultaneously estimating, via an iterative numerical optimization scheme, the single distortion parameter and some internal parameters such as focal length, given the 3D position of a set of control points. The external parameters or position of the camera is already computed in a previous step. The disadvantage of this approach is that it requires known 3D control points and in return offers relatively low accuracy for all but simple distortion profiles. Algorithmic variations on this principal have been proposed by some, such as Weng et al. (1992) and Wei and Ma (1994) using more appropriate models for lens distortion. These methods also require known 3D control points.

The generation of distortion corrected images is investigated in Heikkila and Silven (1997), while Heikkila (2000) describes a similar technique that requires 3D control points or multiple image sets of 2D control points. An alternative method also based on multiple sets of 2D control points has been advanced in Zhang (1998, 2000) and Sturm and Maybank (1999). This technique addresses distortion through an alternating linear least squares solution which is then iteratively adjusted in a numerical minimization including all estimation parameters. The relative complexity of these techniques is increased by the inclusion of lens distortion.

On the other hand there are many situations where only distortion removal is required, not the full complement of intrinsic and extrinsic parameters. An example is in the estimation of multiple view geometry in real images, where techniques have been specifically developed to accommodate lens distortion. Zhang (1996) investigates the possibility of simultaneously estimating distortion parameters and the Fundamental Matrix. The results conclude that this is possible if noise is low and distortion is high. Fitzgibbon (2001) (with patent Fitzgibbon (2003) GB2380887), Micusik and Pajdla (2003) and Barreto and Daniilidis (2004) use an alternative model for distortion, leading to a polynomial Eigenvalue problem and a more reliable estimation of distortion and geometry. Stein (1997) took the reverse approach and used the error in Fundamental Matrix estimation as an objective error to estimate distortion parameters.

Alternative methods of distortion calibration exist, where control points correspondences are abandoned in favor of distortion free scenes. These scenes are then imaged by the camera system, whereupon an image alignment process is conducted to correct for distortion. Lucchese and Mitra (2003) describe a technique where the distorted image is warped until it registers (in intensity terms) with the reference image. A similar technique using a coarse filter to find registration is described in Tamaki (2002) (with patent Tamaki et al. (2002) US2002057345) while Sawhney and Kumar (1999) (also with patent Kumar et al. (1998) WO9821690) describe a registration technique that does not require an undistorted reference image. Instead, multiple images are registered for the generation of a mosaic image, for example such as a panoramic resulting from the combination of several different views, and distortion is simultaneously estimated. These techniques have a very high computational overhead, with twenty minutes quoted in Tamaki (2002).

A final class of non-metric calibration methods are based on distortion induced high-order correlations in the frequency domain. Farid and Popescu (2001) describe a technique, however its performance is poor in comparison with regular camera calibration techniques and it also appears to be slightly dependent on the image content. Yu (2004) further develops this approach with alternative distortion models and reports accuracy approaching that achieved with regular camera calibration if the source image is of a regular calibration target. Finally, a means of fabricating a curved CCD array has been suggested by Gary (2003) US2003141433. In the lens distortion profile is copied in the array by a series of line segments, thus the resulting image appears distortion free.

SUMMARY

The solution provided herein may be considered non-metric as no regular internal or external camera parameters are explicitly required. This solution is found with much higher stability and precision than other non-metric approaches. The performance at least matches, and often surpasses, that of complete calibration methods. Its practical implementation is very straightforward, requiring the camera to capture only a single view of a readily available calibration target. A more complete understanding of the invention will be appreciated from the description and accompanying drawings and the claims which follow.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 3 is a table showing the properties of a proposed algorithm of Method 1 in comparison to alternate techniques;

FIG. 4 is a table of residual errors for Method 1 in mean (SD) format;

FIG. 5 is a table of Residual Errors for a prior art method (Method 2) in mean (SD) format;

FIG. 6 is a table of Residual errors for a prior art (Method 3) in mean (SD) format;

FIG. 7 is a table of Residual errors for a prior art (Method 4) in mean (SD) format;

FIG. 8 is a table of real distortion samples, including the number of iterations for each of the methods where available;

FIG. 10 is a table of distortion residuals on real examples;

FIG. 11 is a table of a comparison of Method 1 to prior art method 2 both using the same distortion model (i.e. two parameter radial model);

FIG. 23 is a table illustrating the estimates of the distortion center for each of the prior art methods 2, 3 and 4 and the method of the present application.

DETAILED DESCRIPTION

Figure 1:
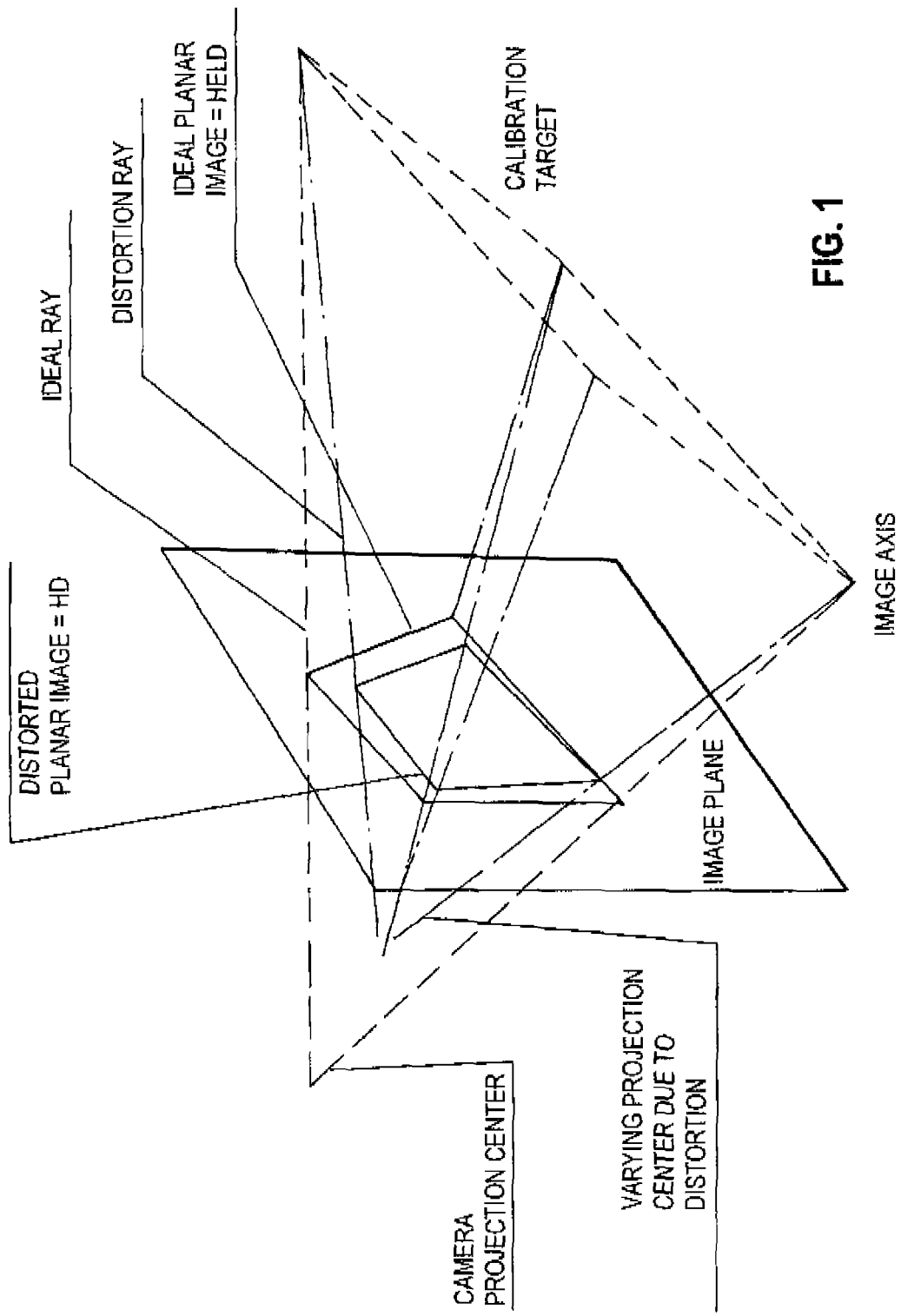
FIG. 1 is a graphical interpretation of the formation of a distorted image and its undistorted counterpart.

The present invention addresses a problem of geometric distortion in optical systems by rearranging the sensor readings to compensate for its presence. Any array type lens system is applicable such as infrared sensors and optical laser deflection systems, color and monochrome cameras regardless of resolution. The method of the present invention is highly accurate, stable and suitable for all levels of lens distortion. The correction method of the present application may be applied to both RAW and processed images. However, where other corrections for other distortions are also applied, the process may more suitably be performed on RAW format images in advance of or subsequent to the other correction processes.

Many calibration methods are complicated to carry out, requiring multiple views of a target while avoiding degenerate configurations. Their software requirements are also nontrivial, often requiring a complete nonlinear bundle adjustment optimization. Whilst these methods may be suitable for complex industrial applications, they are not generally suitable for mass produced consumer products. In contrast, the method of the present invention provides a simpler method requiring one view of a calibration target which may be easily taken in a fronto parallel position. The position of the pattern relative to the camera coordinate system is not required. Two constraints are placed on the calibration target, that of planarity and known structure. These requirements are easily met, for example a regular pattern such as a chessboard has a regular grid structure and is easily made planar. The method does not require that the pattern be present in a specific location or orientation merely that the structure is known and entirely captured in an acquired image on the sensor. By known structure, it is meant that the configuration of the pattern is known in 2 dimensions (e.g. for a checkerboard pattern the number of square in each dimension in contrast the physical size is not important).

In addition, the problem of optimally forming a new aberration free image from an initial digital representation is addressed. The optimization is focused on minimizing the unavoidable resampling errors due to the sealing and sheering effects of the digital interpolation. As discussed below, a mathematical formulation is described to automatically compute an affine transform to minimize these distortions, improving the overall image quality.

As described in the background, lens distortion can comprehensively degrade the accuracy of measurements made in real images, where pixels in a normal perspective camera with a low focal length may move up to 30 pixels. In terms of the removal of such distortions, a precise means of calibrating and removing distortion is in conjunction with a full calibration of the internal and external parameters. The importance of distortion in this regard has seen the utter dominance of these more complicated algorithms at the expense of those that do not consider distortion. Despite this, many applications do not require the full complement of internal camera parameters and the relative orientation in relation to some calibration target. Selections of these, such as multiple view geometry estimation, in cases prefer to explicitly include lens distortion factors at the expense of extra complexity.

Algorithms for internal and external camera calibration, multiple view geometry estimation, etc. are rendered considerably simpler by the lack of lens distortion. However, despite the long term existence of non-metric calibration techniques to enact this removal of distortion, they have not been adopted. It is believe, that this may be due to poor performance of such methods, their limited circumstances of usage, and their own relatively complex practical implementation. The present application comprehensively teaches an easy to use and highly precise method for calibrating lens distortion of all levels in perspective cameras.

The present application is non-metric, as no internal or external camera parameters are explicitly available or required (although where the camera parameters are adjustable, these may be employed as inputs to improve performance). Non-metric refers to the unavailability of any internal or external camera parameters or orientations. The method exploits two geometric priors on the planarity of the control points and their known structure up to an arbitrary scale. Using a single view of the calibration pattern, an error function is formed in distorted space using a conventional mathematical distortion model. It will be appreciated that the model may be rewritten in non-distorted space, however this has the disadvantage of possibly reduced precision. As will be discussed below, the necessary undistorted coordinates are simultaneously estimated through a general projective transform. The partial derivatives of a quadratic cost function are then computed for all estimated parameters, allowing the closed form computation of the cost gradients for minimization. The resampling of an aberration free image is interpreted as a function (using resampling) in distortion free coordinate space, hence the calibrated forward distortion model generated by the method may be applied directly to distorted images. Automatic resealing may be applied to balance the creation and loss of pixels in this resampling.

In comparison with the current benchmark for calibrating distortion through full camera calibration, the proposed approach has numerable advantages. Only one input image is required for the calibration, ideally taken in a roughly fronto parallel position. The distortion and associated parameters are estimated in a closed form solution with full partial derivatives, giving a computational advantage over current numerical techniques. Closed form in this sense refers to the direct geometric relationship between the criterion and the underlying model, meaning that it is absolutely correct at all times not just upon convergence conditions. The accuracy of the method matches and surpasses that of complete calibration over a general coverage of all possible distortion levels in perspective cameras. It also offers an alternative means of dealing with distortion for the many tasks that do not require the full complement of camera parameters. Additionally, the subsequent calibration of internal and/or external camera parameters becomes much simpler in the absence of lens distortion.

In an embodiment, the calibration technique pursued requires one view of a calibration pattern. Two geometric priors are assumed on this calibration target, that of planarity and of known (up to an arbitrary scale) canonical coordinates for the pattern defined control points. Additionally, it can be assumed that all control points are observable within the image window and are appropriately ordered so as to correspond with the scaled canonical model.

Considering the detection of a chessboard in an unknown position, the intersections with image coordinates are denoted as shown in Equation 1, with units of pixels (pix), a straight forward transform (subtracting fixed values from each of the x and y co-ordinates with scaling for stability purposes when performing calculations, inverse translation and scaling are subsequently applied when correcting an image) is specified to convert these measurements into a lens centered coordinate space.

$\bar{c}=(\bar{u},\bar{v},1)^T$ (1) where $\bar{c}$ is the vector of pixel (control point) measurements made with $\bar{u}$ being the x co-ordinate, $\bar{v}$ being the y co-ordinate (Note: this is expressed and all equations hence are expressed in homogenous form unless stated otherwise).

The required lens centric transform may be defined by Equation 3 below;

$$\bar{p} = \begin{pmatrix} s & 0 & -u_o \\ 0 & s & -v_o \\ 0 & 0 & 1 \end{pmatrix} \begin{pmatrix} \bar{u} \\ \bar{v} \\ 1 \end{pmatrix} = A\bar{c} \quad (3)$$

The lens centric coordinate system obtained by this Euclidian transform applied to measured values can be thought of as the actual metric measurements of the ray intersections with the surface of the sensor pickup (e.g. CCD array), centered on the optical axis of the lens. As most sensors are not aligned accurately with respect to the lens, the center of the sensor array cannot be assumed to contain the optical axis. The precise metric values of the ray intersections are not required to influence the scale of the distortion parameters.

Arbitrary scaling of lens centric coordinates, or equivalently varying sensor resolution, causes the parameter values of distortion to change, not the number of parameters as is clear from Equation 2 below where $\lambda$ is an arbitrary scale and the proof which follows.

(2) $\lambda(\bar{p}-p) = \lambda D(p,k) = D(\lambda p, k_\lambda)$, where $\lambda$ is the scaling factor and $k_\lambda$ is the scaled parameter vector.

$$\text{Proof}: \lambda D(p,k) = D(\lambda p, k_\lambda)$$
$$= \lambda \begin{pmatrix} k_1 \lambda^2 x r^2 + k_2 \lambda^4 x r^2 + \ldots \\ k_1 \lambda^2 y r^2 + k_2 \lambda^4 y r^2 + \ldots \end{pmatrix},$$
$$= \lambda D(p,k),$$

As $k_\lambda$ absorbs the scaling factors as: $k_\lambda = (\lambda^2 k_1, \lambda^4 k_2, \ldots)^T$ As a consequence, the recovered control points are normalized roughly to unit length by the average of the image width and height to standardize the scaling of the distortion parameters and improve the conditioning of the estimation equations.

In the present application, references to the Forward model refer to the system models formulated in distorted space and references to the Reverse model refer to models formulated in undistorted space.

The Forward model of distortion will now be derived and its advantages in comparison with other models theoretically argued and experimentally shown. The distortion may be expressed as shown in Equation 4 below:

$$\bar{p} = p + D(p,k) \quad (4)$$

Where $D(p,k)$ is expressed in Equation 5 below:

$$D(p,k) \approx \begin{pmatrix} k_1 x r^2 + k_2 x r^4 + k_3 x r^6 + \ldots \\ k_1 y r^2 + k_2 y r^4 + k_3 y r^6 + \ldots + \\ (p_1(3x^2 + y^2) + 2p_2 xy)(1 + p_3 r^2 + \ldots) + \\ (2p_1 xy + p_2(3y^2 + x^2))(1 + p_3 r^2 + \ldots) \end{pmatrix} \quad (5)$$

In this function, the radial distortion component is represented by $k_1$, $k_2$ and $k_3$ while the distortions introduced by decentering correspond to $p_1$, $p_2$ and $p_3$. These are combined into the parameter vector $k = (k_1, k_2, k_3, \ldots p_1, p_2 \ldots)^T$. It will be appreciated that for radial distortion we are not concerned with the tangential distortion coefficients of $p_1$ $p_2$ and $p_3$ although the method may account for these automatically as will be discussed in detail below.

Given the normalized coordinates, $\check{c}$, of an arbitrarily oriented planar target, a planar transform or homography may be computed as shown in FIG. 1.

A projective 3×3 transformation $H_d$ can be computed between the captured image co-ordinates and a co-ordinate system for the known calibration target. This may be computed from the equation below:

min $\Sigma(\bar{c}, H_d \bar{w})^2$ where $\bar{w}$ are the canonical co-ordinates of the control points of the pattern (e.g. the corners in a chessboard pattern) with unknown scale.

The application of $H_d$ results in $\check{c}$ as shown below:

$\check{c} = H_d \bar{w}$, $H_d$ accounts for scale and position which when combined with $H_e$ described below accounts for the unknown undistorted set of points from the measured set. The transform $H_d$ may readily be determined using a conventional least squares system to match the acquired image of the calibrated target with its known representation.

In addition, a distortion free projection of planar points, viewed from an arbitrary position, may be related to their distorted counterparts through the application of a general projective transform $H_e$ as shown below:

$$c = H_e \check{c} \quad (6)$$

Equation 6 represents a key element in expressing distortion in a closed-form solution, enabling the recovery of the previously unavailable data c, through the simultaneous estimation of 3×3 matrix transform $H_e$. Without loss of generality, $H_e$ is scaled so that $h_{33}$ is one. In practice, no further constraints are available on $H_e$ as the estimate of $H_d$ is corrupted due to noise.

A general form for $H_e$ is to absorb inaccuracies. For each observed control point $\check{c}_i$ an error function, as in Equation 7 may be formed.

$$e_i(\check{c}_i, \phi) = H_e \check{c}_i + D(H_e \check{c}_i, k) - A\check{c}_i \quad (7)$$

, where the full parameter vector is $\phi = (h_{11}, h_{12}, \ldots, s, u_0, v_0, k_1, k_2)$ with $\phi \in \mathbb{R}^{n_\phi}$ It will be appreciated that $\phi$ represents all of the unknown parameters.

In solving a problem, a parameter counting exercise shows that for a parameter vector of length $n_\phi$, a minimum of m=ceil $(n_\phi/2)$ control point observations (for example corners in a chessboard pattern) are required, where ceil ( ) is rounding towards +∞. Given at least n≥m observations, a least square solution may be obtained by Equation 8:

$$\min \sum_{i=1}^{n} e_i(\check{c}_i, \hat{\phi})^2 = \begin{pmatrix} e_i(\check{x}_i, \hat{\phi})^2 \\ e_i(\check{y}_i, \hat{\phi})^2 \end{pmatrix} \quad (8)$$

This problem is nonlinear requiring a nonlinear optimization solution. One standard way of solving such an equation is to linearize it Equation 8 with some initial parameter value of $\phi_0$, resulting in an iterative Gauss-Newton scheme which can be solved using many robust least square techniques, such as Equation 9:

$$\hat{\phi}_{k+1} = \hat{\phi}_k - \lambda \left( \frac{\partial e^T(\check{c}, \hat{\phi}_k)}{\partial \phi} \frac{\partial e(\check{c}, \hat{\phi}_k)}{\partial \phi^T} \right)^{-1} \frac{\partial e(\check{c}, \hat{\phi}_k)}{\partial \phi^T} e(\check{c}, \hat{\phi}_k) \quad (9)$$

Such techniques for solving systems will be readily familiar to those skilled in the art.

An analysis by the inventor of the noise in the detected data revealed that the data covariances are approximately equal, so that no covariance matrix is required in this solution (covariance is effectively equal to an identity matrix).

An initial estimate for the parameters of A are s=1, $u_o=m_x$ and $v_o=m_y$, where $m_x$ and $m_y$ are the normalized coordinates of the image center. Alternatively, an initial estimate for the parameters $h_{11}$, $h_{22}$ and $k_l$, may be obtained directly from the linear solution of Equation 10:

$h_{dieg}, k_l)^T = T^+ b$, where $$T = \begin{pmatrix} \tilde{x}_1 & \tilde{x}_1 \tilde{r}_1^2 \\ \tilde{y}_1 & \tilde{y}_1 \tilde{r}_1^2 \\ \vdots \\ \tilde{y}_n & \tilde{y}_n \tilde{r}_n^2 \end{pmatrix}, \quad b = \begin{pmatrix} \tilde{u}_1 - m_x \\ \tilde{v}_1 - m_y \\ \vdots \\ \tilde{v}_n - m_y \end{pmatrix},$$

where $\tilde{x} = \tilde{u} - m_x$, $\tilde{v}_y = \tilde{v} - m_y$, $\tilde{r}^2 = \tilde{x}^2 + \tilde{v}_y^2$ and $(.)^+$ denotes the pseudo inverse.

From which the parameter vector including three terms for radial distortion may then be initialized, as in Equation 11:

$\phi = (h_{dieg}, 0, -m_x, 0, h_{dieg}, -m_y, 0, 0, 1, -m_x, -m_y, k_l, 0, 0)^T$ Using either method for initialization, it will be appreciated that the solution of equation 8 provides sufficient information to subsequently remove distortion from any captured image by resampling or image warping.

Resampling or image warping computes new samples on a target image from original samples on a source image. Two frequently used and well known interpolation filters are nearest neighbor and bilinear interpolation, although it will be appreciated that others may be employed. The formation of a new undistorted image I(x) may be formed from an distorted image Ĭ(x) knowing the forward distortion model parameters from the original image as in Equation 12:

$I(x) = R(\breve{I}(x + D(x, \hat{k})))$     12)

Equation 12 has an advantage that the calibrated forward distortion model may be used directly, without a need for an inverse function.

Figure 2A:
FIG. 2A is an original distorted image.
Figure 2B:
FIG. 2B is a resampled image.
Figure 2C:
FIG. 2C is an optimally adjusted resampled image.
Figure 9A:
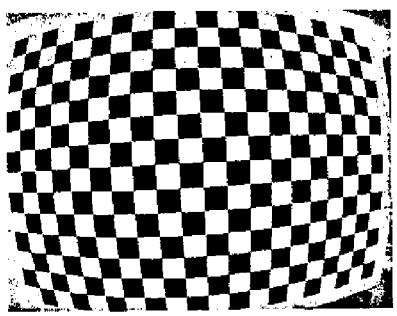
FIGS. 9A, 9B and 9C are illustrations showing three calibration images.
Figure 9B:
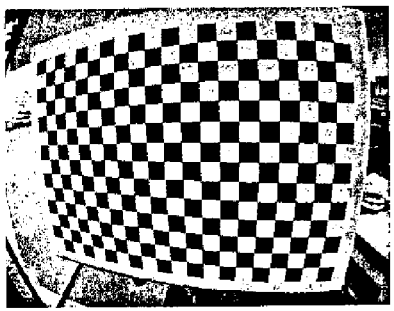
Figure 9C:
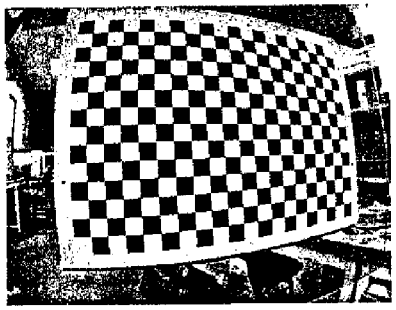
Figure 9D:
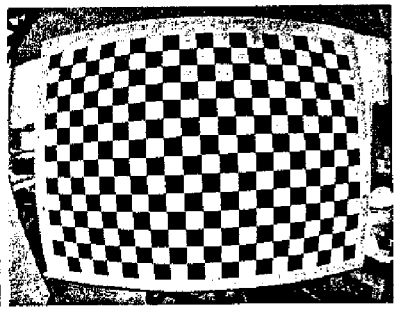
FIG. 9D is an illustration of an evaluation image.

The modeling of distortion, according to Equation 7, does not consider the optimal formation of a new distortion free image. Thus, for barrel distortion, image warping according to Equation 12 results in the stretching of central pixels to occupy the viewing window, and hence the loss of outer perimeter pixels as other techniques do as well. The reverse case is seen when the new image is compressed into the viewing window, due to the use of an inverse distortion model in the resampling. This image stretching effectively results in a reduction of window size, as illustrated in FIG. 2, which brings forth two issues. Firstly, there is a reduction in the effective field of view or angle of view. This is counter productive as wide angle lenses are chosen for their wide angle of view. Secondly, there is an increase in noise and a degradation of image quality in comparison to the original image, due to the creation of new pixels by zooming-like action of the warping.

To address this issue, the image warping of Equation 3 is modified, by taking into account local pixel distortions. These pixel distortions are the result of the increasing pixel area warping, radially from the center of the lens distortion. By introducing the ability to compress pixels in the resampling process, the overall pixel distortions may be balanced or minimized. This is accommodated by introducing all appropriate scaling matrix S into the resampling in Equation 13:

13) $I(x) = R(\breve{I}(Sx + D(Sx, \hat{k})))$, where the scaling matrix s contains one variable s, as $$S = \begin{pmatrix} s_1 & 0 & s_1 \hat{u}_0 - \hat{u}_0 \\ 0 & s_1 & s_1 \hat{v}_0 - \hat{v}_0 \\ 0 & 0 & 1 \end{pmatrix},$$

and $(\hat{u}_0, \overline{v}_o)$ is the estimated distortion center

A measure of the local pixel distortion may be compiled by taking the Jacobian of the local, area around point p as in Equation 14:

$$J(p) = \begin{pmatrix} 1 + \frac{\partial D_x(p, k)}{\partial x} & \frac{\partial D_x(p, k)}{\partial y} \\ \frac{\partial D_y(p, k)}{\partial x} & 1 + \frac{\partial D_y(p, k)}{\partial y} \end{pmatrix} \quad 14)$$

which gives the size ratio of the newly created pixel at the location p to its original location. If $\lambda_1$ and $\lambda_2$ are the Eigenvalues of J(p), then the net measure of the local pixel distortion may be obtained by taking its determinant as $\det(J(p)) = \lambda_1 \lambda_2$. Because the Eigenvalues of an orthogonal transform are equal to one, the ideal value of the determinant causing no net size change is also one. A compression of pixel size results in a determinant of less than one, while the enlarging of pixel size results in a determinant greater than one.

Pixel distortion may be minimized by choosing a scaling parameter $s_l$ that minimizes Equation 15.

$$\min \sum_{i=1}^{n} (\det(s_1 I_{2 \times 2} J(p_1)) - 1)^2 \quad 15)$$

As $\det(AB) = \det(A)\det(B)$ $A, B \in \mathbb{IR}^{m \times m}$ and $\det(s_1 I_{2 \times 2}) = s_1^2$ this minimization can be solved linearly as follows $$s_1 = \sqrt{\frac{1}{\frac{1}{n}\sum_{i=1}^{n} \det(J(p_i))}}$$

The point set $p_i$ may be chosen as a grid covering the entire image area. The density of this grid has a very minor influence on the overall scaling parameter $s_1$.

This improved resampling, by considering the local pixel distortions, is illustrated in FIG. 2. It may be observed that the scaling solution avoids including peripheral areas of the original image as these areas would induce large pixel distortion after image warping. The balance that is reached is a clear improvement in terms of the resulting field of view over the original unsealed method. This formulation assumes that the new image dimensions are the same as the original. An alternative means of implementing the same effective field of view is to enlarge the destination image. The optimal enlargement in this case is described by the scaling matrix S solved with Equation 15.

As described above, decentering the distortion parameters to $p_1$, $p_2$ and $p_3$ do not need to be explicitly included, as the interplay between certain parameters enables the implicit modeling of this type of distortion as will be clear from the proof below, moreover their inclusion may lead to an overparametcrised solution. In particular, considering that the projective error transformation $H_e$ may, at least, introduce a variable center point by the simple adjustment of $h_3 \to h_3 + \Delta_x$, and $h_6 \to h_6 + \Delta_y$ resulting in equation 16 below.

$$D(p + \Delta, k) = D(p, k) + \begin{pmatrix} k_1 \Delta_x (3x^2 + y^2) + 2k_2 \Delta_y xy + \ldots \\ 2k_1 \Delta_x xy + k_2 \Delta_y (3y^2 + x^2) + \ldots \end{pmatrix} + E \qquad 16)$$

Proof: Considering the formulation of distortion as $D(H_0 \tilde{c}, k) = D(p, k)$ and introducing a pure translation into the results in the shifting of $x \to x + \Delta x$ and $y \to y + \Delta y$. The two parameter radial distortion model then becomes $$D_x(p+\Delta,k) = k_1 x r^2 + k_2 x r^4 + k_1 \Delta_x (3x^2 + y^2) + 2k_1 \Delta_y xy + k_2 \Delta_x (5x^4 + 6x^2 y^2 + y^4) + k_2 \Delta_y (4x^2 y + 4xy^2) + k_1 ((3\Delta_x^2 + \Delta_y^2) x + 2 \Delta_x \Delta_y y + \Delta_x \Delta_y^2 + \Delta_x^3 + k_2 ((5\Delta_x^4 + 6\Delta_x^2 \Delta_y^2 + \Delta_y^4) x + (4\Delta_x^3 \Delta_y + 4 \Delta_x \Delta_y^3) y + \Delta_x^5 + 2\Delta_x^3 \Delta_y^2 + \Delta_x \Delta_y^4 + \ldots))$$

Radial distortion is modeled as before, while $k_1 \Delta_x$, $k_1 \Delta_y$, $k_2 \Delta_x$ and $k_2 \Delta_x$ match the decentering terms derived from the wave aberration equation. The basic introduction of a translation element into $H_c$ thus models decentering distortion with the additional introduction of a small residual $E$. This residual may additionally be approximated by a small affine transformation $E = \Delta_H$.

The objective error $e$ may be rewritten, implicitly modeling decentering distortion as in Equation 17:

$$e(\tilde{c}, \phi) = H_e \tilde{c} + D(H_e \tilde{c}, k) + \Delta_H H_e \tilde{c} - A \tilde{c}. \qquad 17)$$

In the least square estimation, the small decentering residual is absorbed by a combination of $H_e$ and $A$ in the search for a global minimum. It should also be remembered that these equations are only approximations to the actual lens distortion, so such small adjustments are likely to have a negligible impact.

Although, it will be appreciated by those skilled in the art that the partial derivates of Equation 7 may be readily computed using conventional techniques, some further detail is now included.

Partial derivatives for use in an iterative estimation of distortion may be computed using control points. Each control point contributes to the formation of an objective function which must be minimized, as shown in Equation 18:

$$(\tilde{c}, \phi) = H_e \tilde{c} + D(H_e \tilde{c}, k) - A \tilde{c} \qquad 18)$$

Performing a first order expansion of the error around the last estimate results in a Gauss-Newton scheme that can be iterated utilizing many robust least square techniques, as shown in Equation 19:

$$\hat{\phi}_{k+1} = \hat{\phi}_k - \lambda \left( \frac{\partial e^T(\tilde{c}, \hat{\phi}_k)}{\partial \phi} \frac{\partial e(\tilde{c}, \hat{\phi}_k)}{\partial \phi^T} \right)^{-1} \frac{\partial e(\tilde{c}, \hat{\phi}_k)}{\partial \phi^T} e(\tilde{c}, \hat{\phi}_k) \qquad 19$$

In an embodiment, the forward distortion model is computed with three radial distortion parameters with estimated lens centric coordinates of the ideal projections. The derivatives are given exactly as in Equation 20:

$$\frac{\partial e(\tilde{c}, \hat{\phi}_k)}{\partial \phi^T} = \begin{pmatrix} \frac{\partial e_x(\tilde{c}, \hat{\phi}_k)}{\partial \phi^T} \\ \frac{\partial e_y(\tilde{c}, \hat{\phi}_k)}{\partial \phi^T} \end{pmatrix} = \begin{pmatrix} \frac{\partial e_x}{\partial H_e}, -\tilde{u}, 1, 0, \hat{x}\hat{r}^2, \hat{x}\hat{r}^4, \hat{x}\hat{r}^6 \\ \frac{\partial e_y}{\partial H_e}, 0, 0, 1, \hat{y}\hat{r}^2, \hat{y}\hat{r}^4, \hat{y}\hat{r}^6 \end{pmatrix}, \qquad 20)$$

where $$\begin{pmatrix} \frac{\partial e_x}{\partial H_e} \\ \frac{\partial e_y}{\partial H_e} \end{pmatrix} = \begin{pmatrix} \frac{\partial \hat{x}}{\partial H_e} + k_1 \left( (3\hat{x}^2 + \hat{y}^2) \frac{\partial \hat{x}}{\partial H_e} + 2\hat{x}\hat{y} \frac{\partial \hat{y}}{\partial H_e} \right) + \ldots \\ \frac{\partial \hat{y}}{\partial H_e} + k_1 \left( 2\hat{x}\hat{y} \frac{\partial \hat{x}}{\partial H_e} + \hat{x}^2 + 3\hat{y}^2 \right) \frac{\partial \hat{y}}{\partial H_e} + \ldots \end{pmatrix}$$

$$k_2 \left( (5\hat{x}^4 + 6\hat{x}^2 \hat{y}^2 + \hat{y}^4) \frac{\partial \hat{x}}{\partial H_e} + (4\hat{x}^3 \hat{y} + 4\hat{x}\hat{y}^3) \frac{\partial \hat{y}}{\partial H_e} \right) +$$

$$k_2 \left( (4\hat{x}^3 \hat{y} + 4\hat{x}\hat{y}^3) + \frac{\partial \hat{x}}{\partial H_e} + (\hat{x}^4 + 6\hat{x}^2 \hat{y}^2 + 5\hat{y}^4) \frac{\partial \hat{y}}{\partial H_e} \right) +$$

$$k_2 \left( (4\hat{x}^3 \hat{y} + 4\hat{x}\hat{y}^3) + \frac{\partial \hat{x}}{\partial H_e} + (\hat{x}^4 + 6\hat{x}^2 \hat{y}^2 + 5\hat{y}^4) \frac{\partial \hat{y}}{\partial H_e} \right) +$$

$$k_3 \begin{pmatrix} (7\hat{x}^6 + 15\hat{x}^4 \hat{y}^2 + 9\hat{x}^2\hat{y}^4 + \hat{y}^6) \frac{\partial \hat{x}}{\partial H_e} + \\ (6\hat{x}^5 \hat{y} + 12\hat{x}^3 \hat{y}^3 + 6\hat{x}\hat{y}^5) \frac{\partial \hat{y}}{\partial H_e} \end{pmatrix}$$

$$k_3 \begin{pmatrix} (6\hat{x}^5 \hat{y} + 12\hat{x}^3 \hat{y}^3 + 6\hat{x}\hat{y}^5 + \hat{y}^6) \frac{\partial \hat{x}}{\partial H_e} + \\ (\hat{x}^6 9\hat{x}^4 \hat{y}^2 + 15\hat{x}^2 \hat{y}^4 + 7\hat{y}^6) \frac{\partial \hat{y}}{\partial H_e} \end{pmatrix}$$

Where $$\begin{pmatrix} \frac{\partial \hat{x}}{\partial H_e} \\ \frac{\partial \hat{y}}{\partial H_e} \end{pmatrix} = \begin{pmatrix} \tilde{x}, \tilde{y}, 1, 0, 0, 0, -\tilde{x}\tilde{x} - \tilde{x}\tilde{y} \\ 0, 0, 0, \tilde{x}, \tilde{y}, 1, -\tilde{y}\tilde{y} - \tilde{x}\tilde{y} \end{pmatrix} \Big/ h_{31}\tilde{x} + h_{32}\tilde{y} + 1$$

It will be appreciated that these equations may readily be solved using conventional software programming techniques. In particular, the techniques of the present application may be applied irx a variety of different ways in both cameras and projection devices. In the case of a camera, the correction method is applied after an image has been sensed at the camera sensor, whereas in the projection device, it is applied before being presented to the projecting elements.

An exemplary process for correcting a subsequently acquired image using the previously determined parameters. Once an image is acquired, the distortion model is then applied.

It will be appreciated that whilst the important factor is that the model is based on measurements taken, the compact nature of the model is such that the model may be applied within the camera. However, the method need not be applied directly within the camera and may be applied to the captured images using external image processing software. The external software may be specifically for the purpose of correcting images or it may be provided as a plug-in for more general image processing software, such as for example Adobe Photoshop™.

In one arrangement, a kit is provided to a user including a reference image (checkerboard) and the software to produce correction information for their individual lenses. This information may then be stored and applied as required to images taken using a particular lens to correct for distortion.

Where the correction process is included in the camera, less expensive lenses may be employed to achieve comparable results to more expensive lenses where the correction process is not employed. Thus for example, the process may readily be employed in compact digital cameras and mobile phones to improve image quality without increasing the cost of the optics. To achieve this, the cameras may be calibrated during or at the end of the manufacturing process to determine the correction parameters which may subsequently be employed to correct acquired images.

In more expensive cameras, such as digital SLR's where the lenses may be changed, the firmware of the camera may be configured to include the above described correction process. In this arrangement, the camera firmware may be configured initially or updated to determine the correction model parameters. In this arrangement, the correction model parameters may be determined by running through a calibration routine performed by the firmware for each lens of the user. The determined calibration settings may then be associated with the individual lens, e.g. by reference to the identification of the lens when it connects to the camera or alternatively by selection of the user from a menu. It will be appreciated that users may prefer not to have this complexity or they may prefer to share the information between several cameras. In this scenario, the parameters for the correction may be stored in a memory card or similar and loaded into the camera as required. This type of scenario is known where user's custom settings may be saved and retrieved from a memory card.

In another arrangement, the lenses are calibrated during their manufacturing process to determine appropriate correction parameters and these parameters are stored as meta data within the lens for loading by a camera subsequently when connected. The correction of an image taken with a lens could then be implemented onboard the devices hardware (similar to the white balance function) or on an external processor.

In addition to imaging systems for cameras, the technology may also be applied to industrial inspection systems and image projection systems. In the case of image projection systems it will be appreciated that the distortion occurs in reverse to a camera, i.e. the original image is perfect and it is the projection through the lens that introduces distortion. To address this, the corrections would be applied to the data sent to the projector (or indeed within the projector) such that when the corrected image is transmitted through the lens, the viewer sees the original and thus uncorrected image The image processing path is modified slightly within this processing path as would be appreciated by the person skilled in the art. Similarly, the method is not restricted to stills cameras and may be applied to video. Thus for example, correction for distortion could be applied to frames from a webcam before transmission from a computer.

Moreover, the potential impact of a commercially available method to calibrate and optimally remove lens distortion is quite vast, and it is difficult to touch on every conceivable application area Some general things to note is that the equations and method are applicable to any lens system, such as infrared cameras and laser scanning systems. The developed method is directly applicable to these technologies, only limited by the calibration target design. With regard to the application to images, it is important to be aware that although this method is not a full calibration technique, the absence of lens distortion vastly simplifies the subsequent complete calibration. In this sense, the method influences such areas where full calibration is required. The following is a incomplete overview of the areas where there is obvious commercial potential relating just to camera technologies.

Theoretically, any imaging system that makes image measurements assuming a pinhole or perspective image formation model will benefit from this invention. For example, specific advantageous are gained for the various existing and developing 3D camera sensors such as stereo, depth from focus, defocus, shading, shadow and more. For precise operation these methods at least need to be free of lens aberrations. In medical imaging field, the method has direct application to the correction of endoscopic images.

Vision inspection systems are widely used within industry due to their unique capabilities and reliability. They are employed in many different areas, from pharmaceuticals to automated computer manufacturing. With the advent of precise distortion calibration, the constraints on the lens are relaxed, allowing the use of lower focal lengths with wider field of view to position the cameras closer to the objects. This both reduces the cost of the optical system and yields a much smaller and compact inspection stage. The straightforward calibration procedure allows easy on site calibration without expert knowledge or precise positioning equipment.

Another related idea is the use of very low focal length lenses in TV systems, to avoid having to elevate a camera (and operator) to large heights to capture birds eye views such as often seen in sports coverage. Much lower elevations may be used with fish-eye type lenses followed by correction for distortion and optimal image re-formatting as described by the present invention. The resulting image will appear to have been taken from an enormous height if the lens field of view is up to 160 to 170 degrees.

Digital camera technology is evolving to the stage where the image undergoes significant processing within the camera. The developed methods, including the optimal image regeneration may be included to correct for lens aberrations within the camera DSP. Such an ability to post-correct an image will allow less emphasis to be placed on the lens. This has a clear expanding market in compact phone cameras, where the limiting factor is the physical dimensions of the lens. Additionally, the calibration may be offered to professional photographers in the form of a stand alone software to increase the quality of their images.

In addition to visible light frequencies, many lens systems exist that measure different sets of frequencies, such as Infrared cameras and laser measurements cameras. These devices are equally subject to lens distortions, especially if the lenses are not fully optimized for the particular wavelengths used. The present invention is directly applicable to such problems. This may involve altering the nature of the input calibration grid to enable suitable control point detection within the particular imaging modality. The correction systems could then equally be applied within the capturing device, or subsequently on external processing equipment.

To demonstrate the effectiveness of the method (METHOD 1) described herein, a comparison was performed with three other methods (METHODS 2-4).

The assessment was conducted in terms of evaluating how accurate the estimated parameters are in describing lens distortion throughout the image. Generally, it is not enough to merely find the value or the parameters with respect to the objective criteria. It is also important to evaluate the uncertainty attached to the result, taking into account the uncertainty in the data. The three methods were taken from the literature for comparison purposes. These include two full calibration methods and one truism based method.

From a least squares or nonlinear least squares estimation problem the residual error vector may be calculated. However, instead of calculating this residual, an alternative one is compiled directly using new data. Under the assumption that data error has a zero mean normal random distribution $\mathcal{N}(0, \sigma_{(2,n)})$, the estimation algorithm is asymptotically efficient, implying that with enough data points the exact solution may be recovered. The parameter uncertainty may be estimated from the Fisher information matrix, in Equation 21:

$$F(\hat{\phi}) = \sum_{i=1}^{n} \frac{1}{\sigma_i^2} \frac{\partial e^T(\tilde{c}_i, \hat{\phi}_k)}{\partial \hat{\phi}} \frac{\partial e(\tilde{c}_i, \hat{\phi}_k)}{\partial \hat{\phi}^T} \quad (21)$$

$F^{-1}(\hat{\phi})$ is then used to characterize the uncertainty in the parameters, by forming an estimate of the associated Standard Deviation (SD) as the square root of the $i^{th}$ diagonal element as: $SD(\hat{\phi}_i) = \sqrt{\text{diag}_i(F^{-1}(\hat{\phi}))}$ In the special case where all the $r_n^2$'s are equal and possibly unknown:

$$F(\hat{\phi}_i) = \sum_{i=1}^{n} \frac{1}{\sigma_i^2} \frac{\partial e^T(\tilde{c}_i, \hat{\phi}_k)}{\partial \hat{\phi}} \frac{\partial e(\tilde{c}_i, \hat{\phi}_k)}{\partial \hat{\phi}^T} \quad (21)$$

$F^{-1}(\hat{\phi})$ is then used to characterize the uncertainty in the parameters, by forming an estimate of the associated Standard Deviation (SD) as the square root of the $i^{th}$ diagonal element as $SD(\overline{\phi}) = \sqrt{\text{diag}_i(F^{-1}(\hat{\phi}))}$ In the special case where all of the $\sigma_n^2$'s are equal and possibly unknown:

$$\hat{\sigma}^2 = \frac{1}{n-m} \sum_{i=1}^{n} (\tilde{p} - p - D(p, \hat{k}))^2$$

$F^{-1}(\hat{\phi})$ is the approximated by:

$$F(\hat{\phi}_i) = \frac{1}{\hat{\sigma}^2} \sum_{i=1}^{n} \frac{\partial e^T(\tilde{c}_i, \hat{\phi}_k)}{\partial \hat{\phi}} \frac{\partial e(\tilde{c}_i, \hat{\phi}_k)}{\partial \hat{\phi}^T}$$

With the proposed solution, as Method 1, the initial comparison technique is referred to as Method 2. The full calibration technique takes multiple views of a planar pattern as input. Although distortion calibration is not the main focus of this technique (no decentering and a low order radial (2 parameters) model is used), it provides a useful comparison for lower distortion levels. It is not expected to be highly accurate for larger distortion levels. The method estimates distortion by the numerical solution of the back projection problem in n views with m control points in each view. The available implementation does not return the parameter standard deviations.

Method 3 is also a full calibration method. This method also requires multiple views of a planar calibration object, though 3D coordinates with one image may also be used. Distortion is given prominent focus in this implementation, with the reverse model assumed including decentering distortion. A simplified approximation of its Taylor expansion is used as an inverse. The implementation returns the parameter SD's.

Method 4 is a truism based method, where the estimation is based on the criterion that straight lines in object space must be imaged as straight lines. The input data is formed from the collinear coordinates of the chessboard pattern. This method is implemented by calculating the lines joining the horizontal chessboard intersections as follows:
1. Initialize the principal point, and 4 parameters of the reverse distortion model.
2. A moment matrix is formed representing the algebraic line fit to the input data (the Matrix is shown in Equation 22).

$$M = \begin{pmatrix} \sum_{i=1}^{n} \tilde{x}_1^2 & \sum_{i=1}^{n} \tilde{x}_1 \tilde{y}_1 & \sum_{i=1}^{n} \tilde{x}_i \\ \sum_{i=1}^{n} \tilde{x}_1 \tilde{y}_1 & \sum_{i=1}^{n} \tilde{y}_i^2 & \sum_{i=1}^{n} \tilde{y}_i \\ \sum_{i=1}^{n} \tilde{x}_i & \sum_{i=1}^{n} \tilde{y}_i & n \end{pmatrix} \quad (22)$$

3. Calculate the least square line fit from the Eigenvector associated with the smallest Eigenvalue.
4. Using this line and the input data form the error criterion.
5. Minimize this using the Levenberg-Marquardt (LM) method for the sum of all lines.

Parameter SD's are available upon convergence. A summary of the different properties of each method is given in the table of FIG. 3. The majority of these methods do not include decentering distortion. In order to compare like-with-like decentering distortion is not included in the distortion model of the proposed algorithm, (Method 1).

Comparisons on simulated data are made with respect to varying control point locations and increasing levels of control point noise. Distortion is simulated using a nonstandard formulation in order that the resulting profile does not exactly match with any of the calibration models. Considering a divisional model as described in GB2380887 extra nonlinear terms may be added as follows:
$\check{c} = c/(1 - k_1 r^2 - k_2 r^4)$, where $c = (u, v, 1)^T$ are the undistorted points, $\check{c}$ are the distorted counterparts and $r^2 = (u - u_o)2 + (v - v_o)^2$. The center of distortion $t = (u_n, v_o, 1)^T$ is fixed at approximately $u_o = 732.33$ and $v_o = 812.21$. Distortion parameter $k_1$ is varied in the range of −2 to 1.4 with $k_2$ specified as $k_2 = -k_1/2$, representing a wide range of barrel and pincushion distortions. The lowest level of distortion is $k_1 = 0.01$, effectively showing on the graphs as zero.

The calibration data is comprised of a 10×10 planar grid of equally spaced points (spacing=100 (pix)). Random positions of these points are simulated using a 3D rotation randomly drawn from a specific range of rotation angles, with limited translation. Noise is added to these control points with a normal distribution N (0, $\sigma^2$), where $\sigma^2$ is in the range approximately between 0 and 1 (pix), well in excess of the expected noise range. The evaluation data includes a 20×20 grid (grid spacing=75 (pix)) covering the entire image window.

The method described herein is compared with three alternative methods for robustness to control point positions. One hundred random control point positions are generated for each distortion level and the accuracy and stability of each method is evaluated. Accuracy is measured using the estimated parameters on the evaluation data set. The stability of each estimated parameter is quantified by its variance throughout the one hundred samples.

Figure 17A:
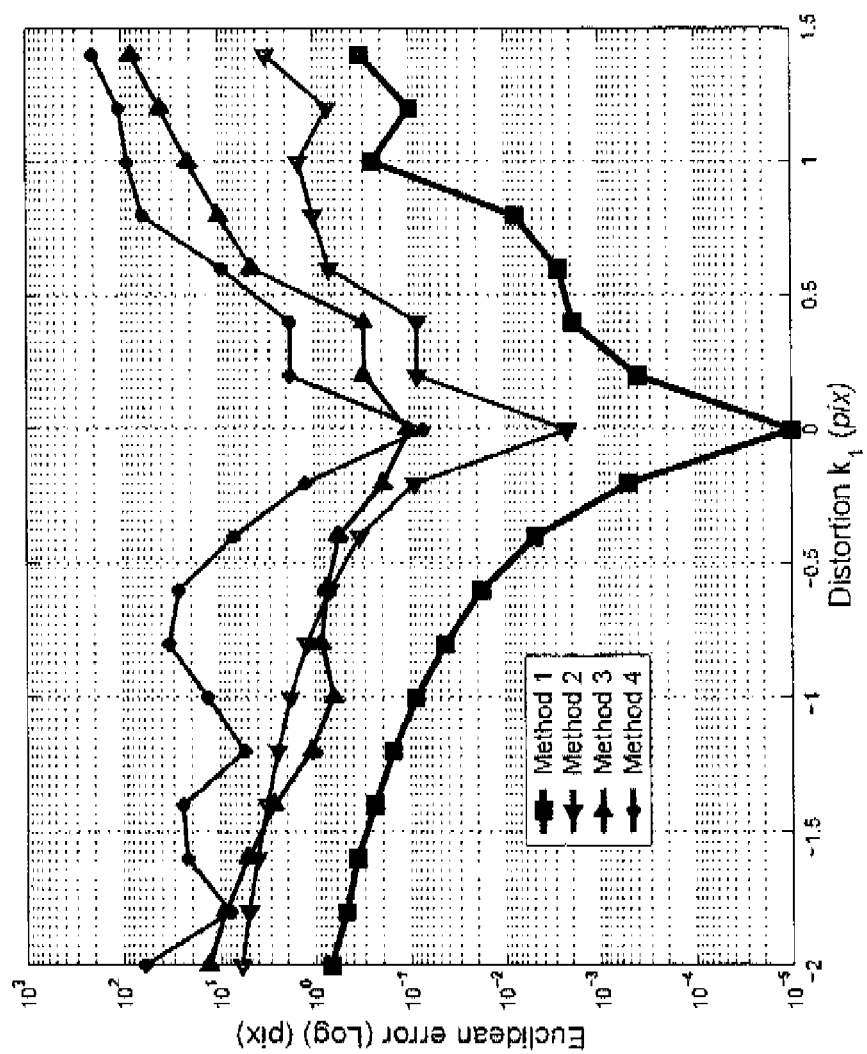
FIG. 17 illustrates a graph of the Mean and SD errors for the 4 methods computed over 100 random positions of control points.
Figure 17B:
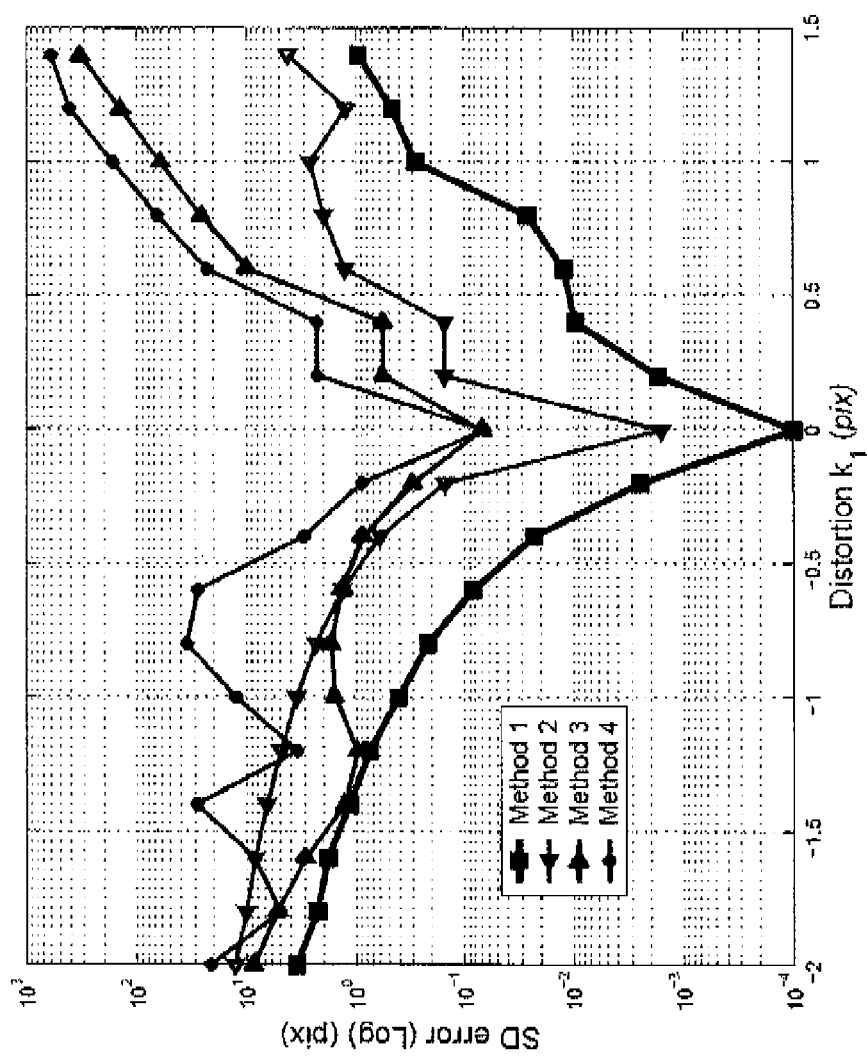
Figure 18A:
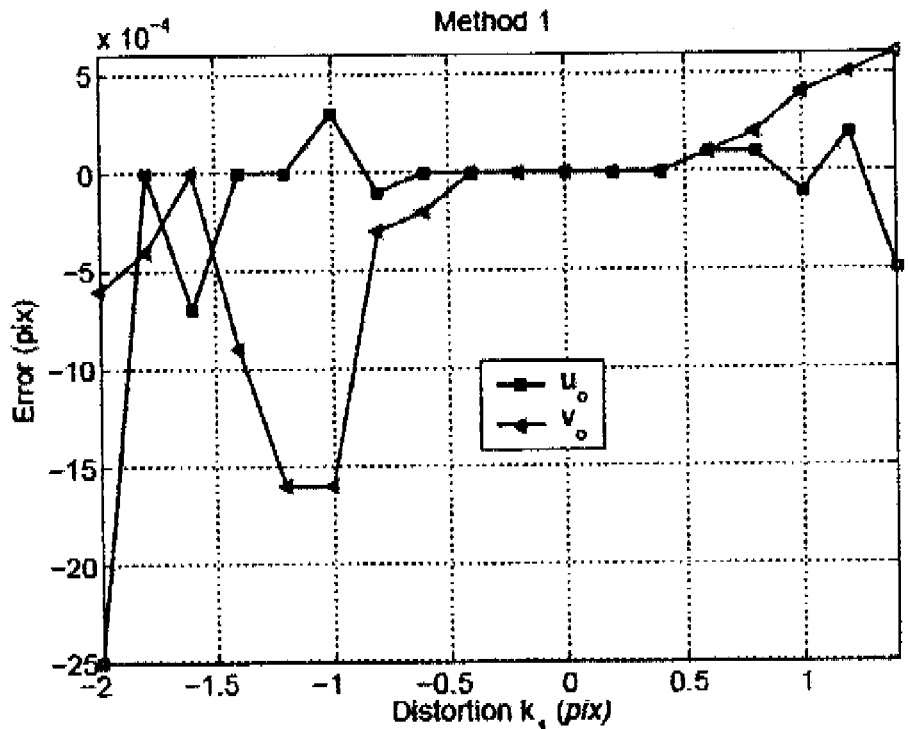
FIG. 18 illustrates the mean estimated distortion center less the ideal value, for the 4 methods over the range of distortion.
Figure 18B:
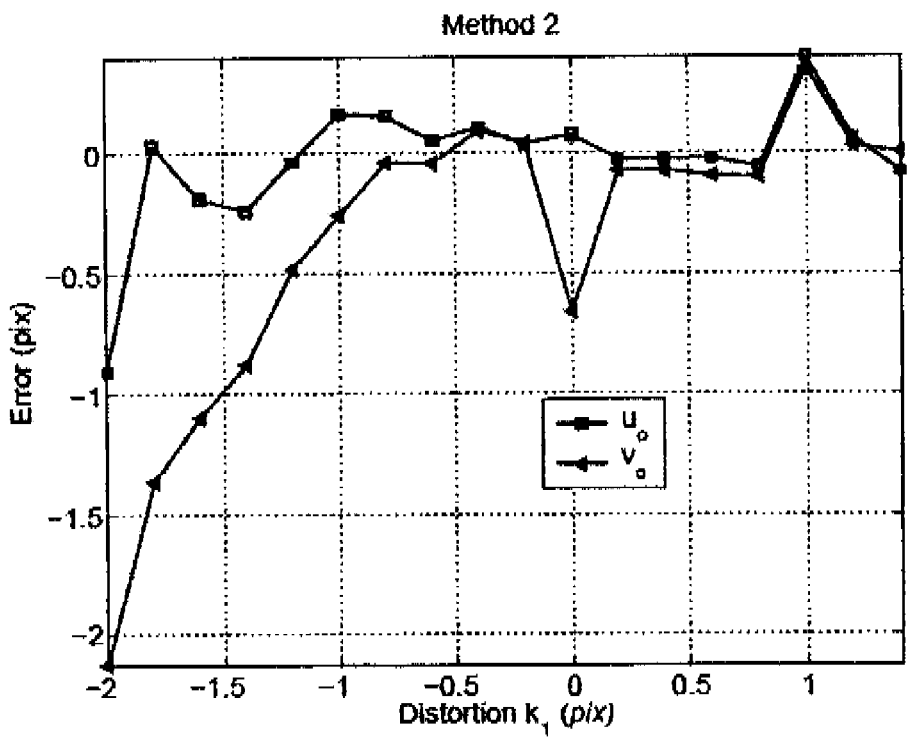
Figure 18C:
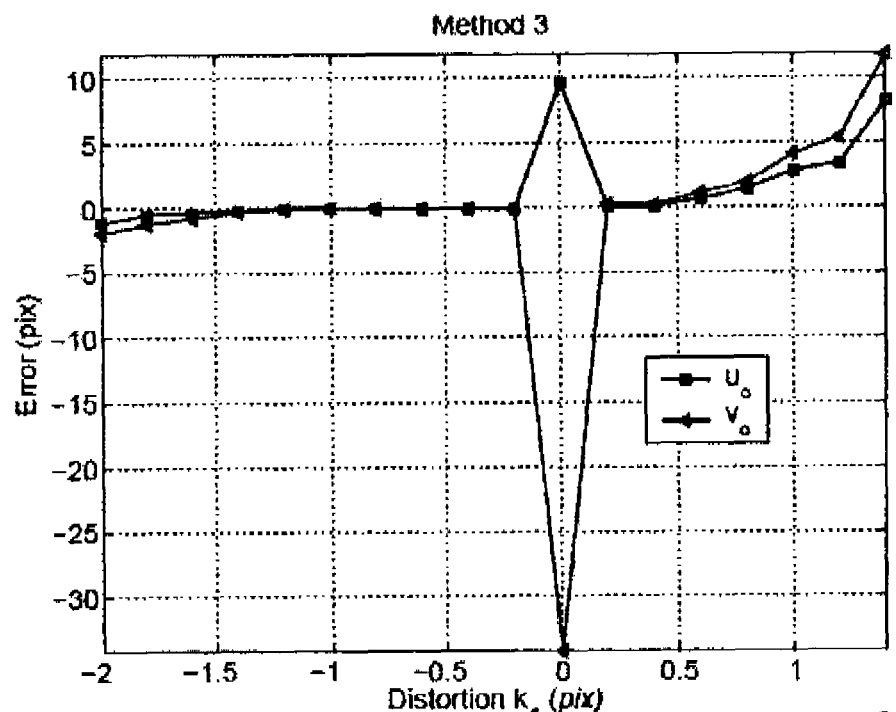
Figure 18D:
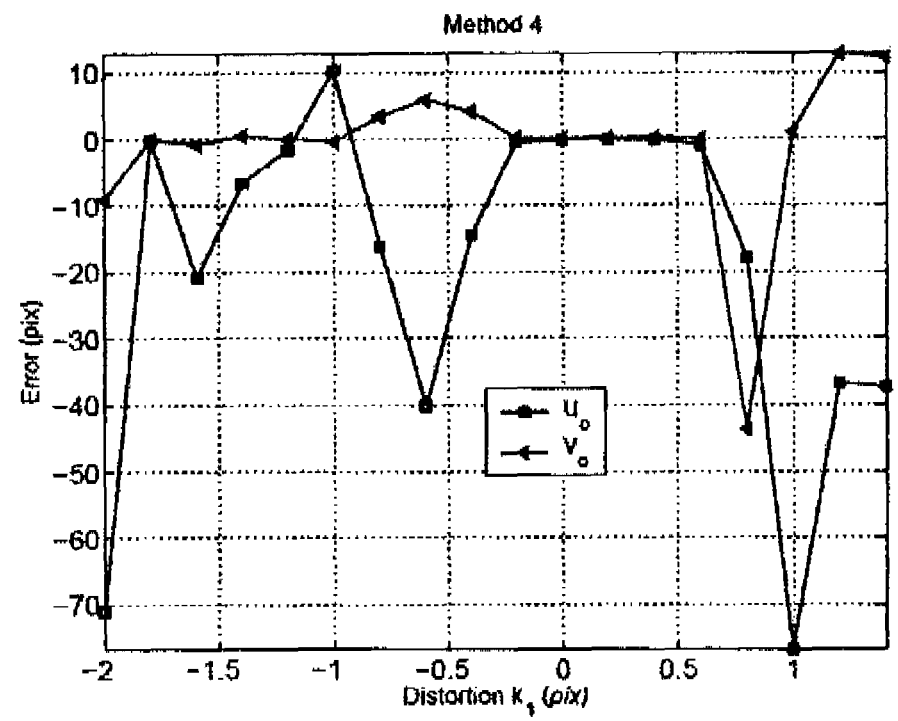
Figure 19A:
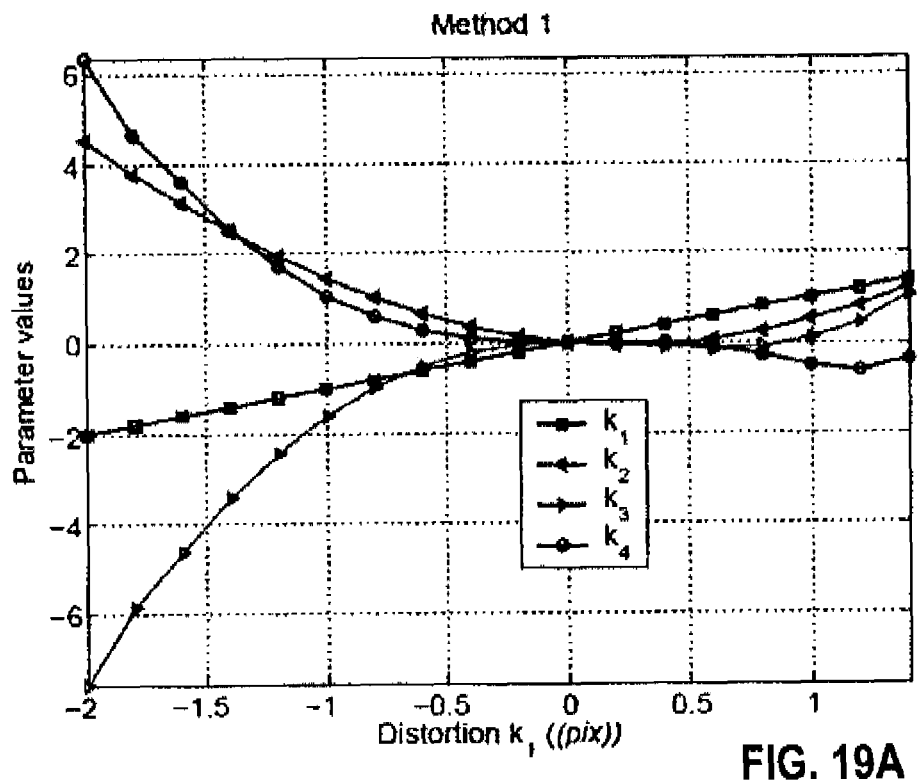
FIG. 19 illustrates the mean and SD of parameter values for Method 1 over the 100 randomly chosen control point locations.
Figure 19B:
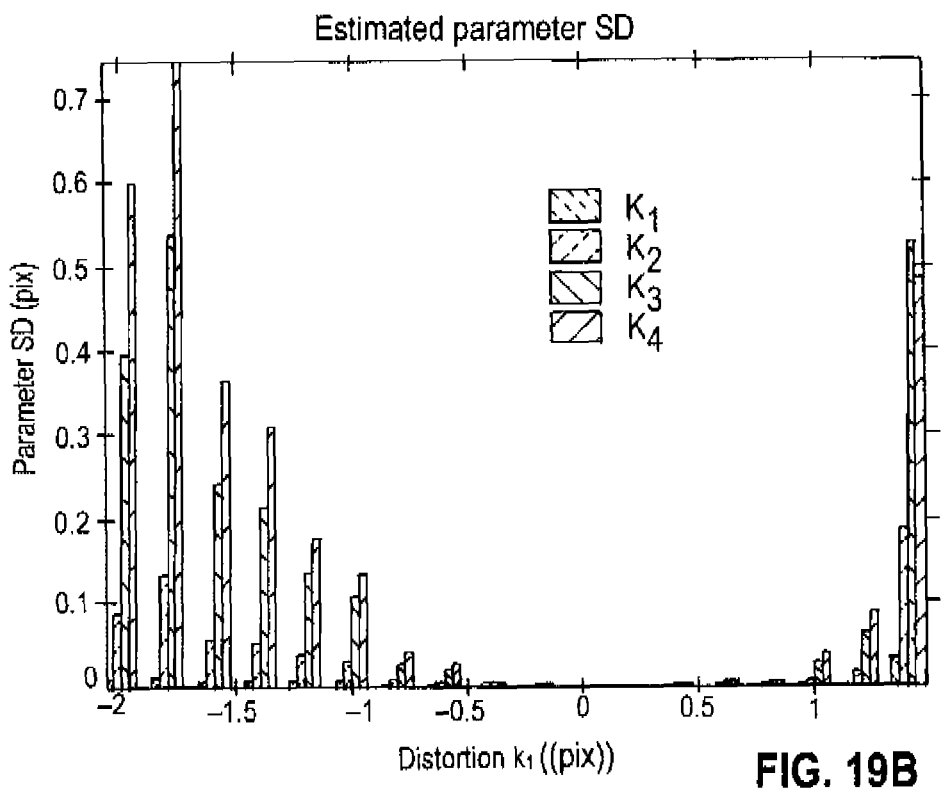
Figure 20A:
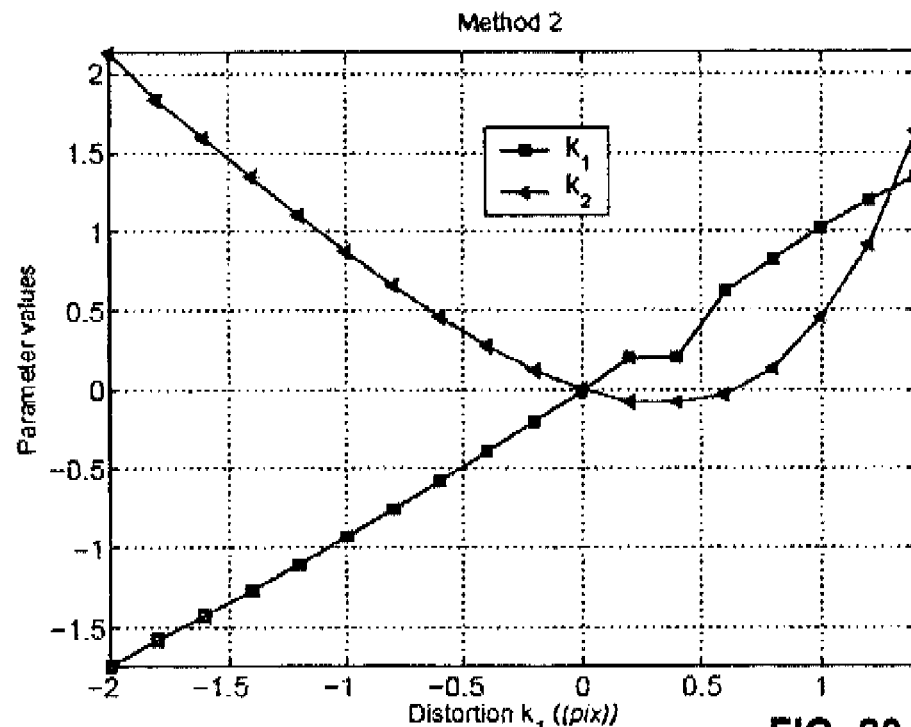
FIG. 20 illustrates the mean and SD of parameter values for Method 2 over the 100 randomly chosen control point locations.
Figure 20B:
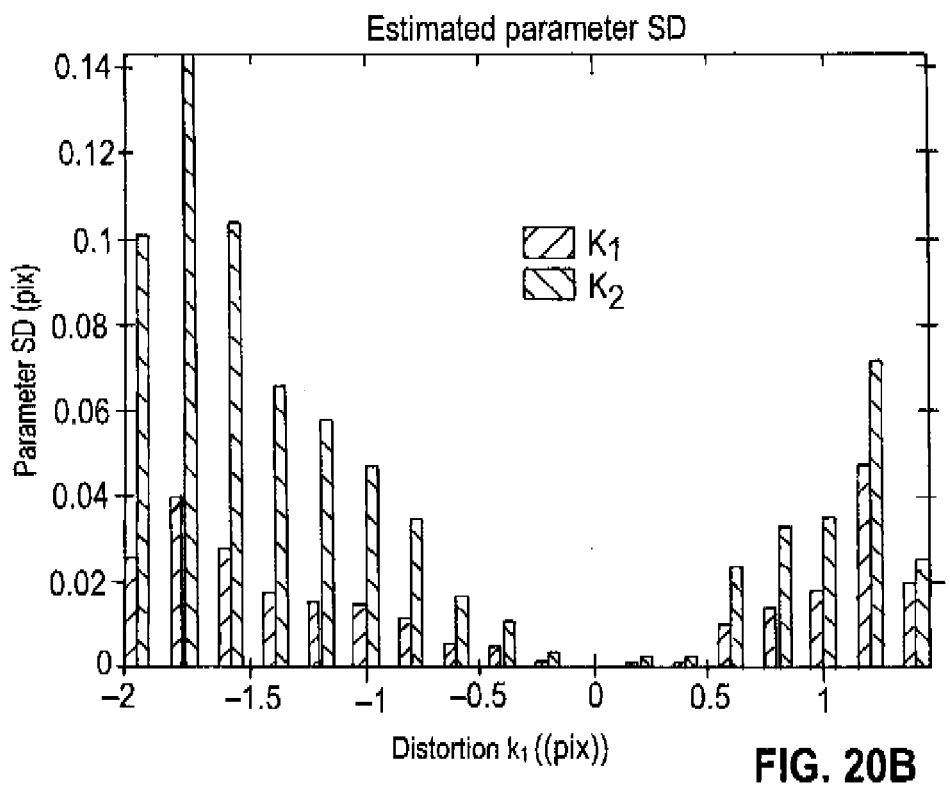
Figure 21A:
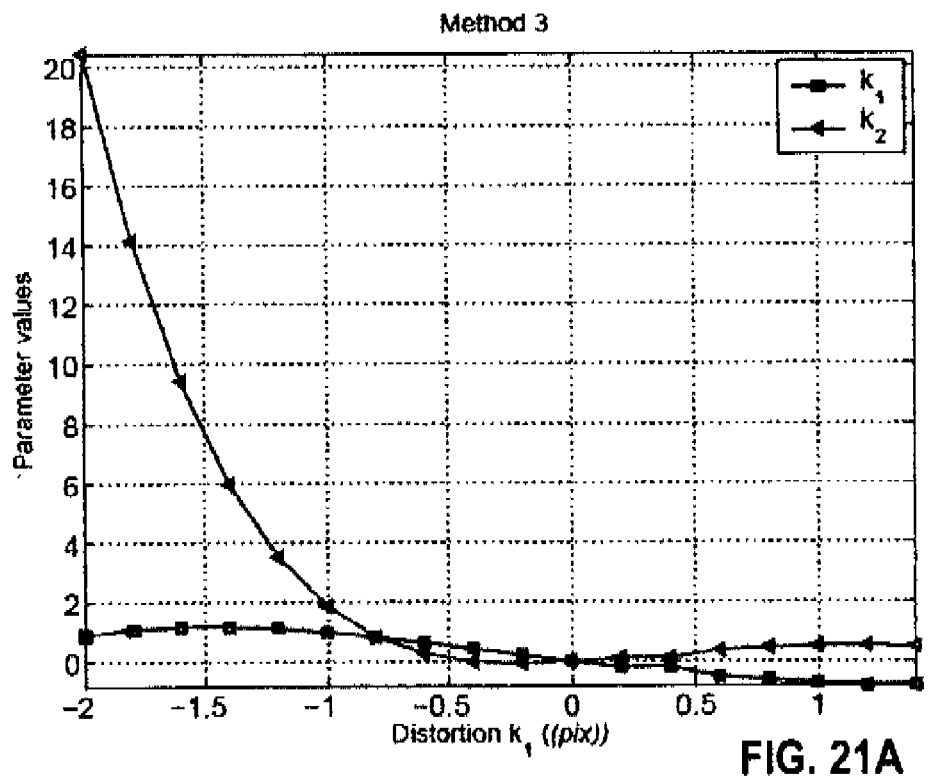
FIG. 21 illustrates mean and SD of parameter values for Method 3 over the 100 randomly chosen control point locations.
Figure 21B:
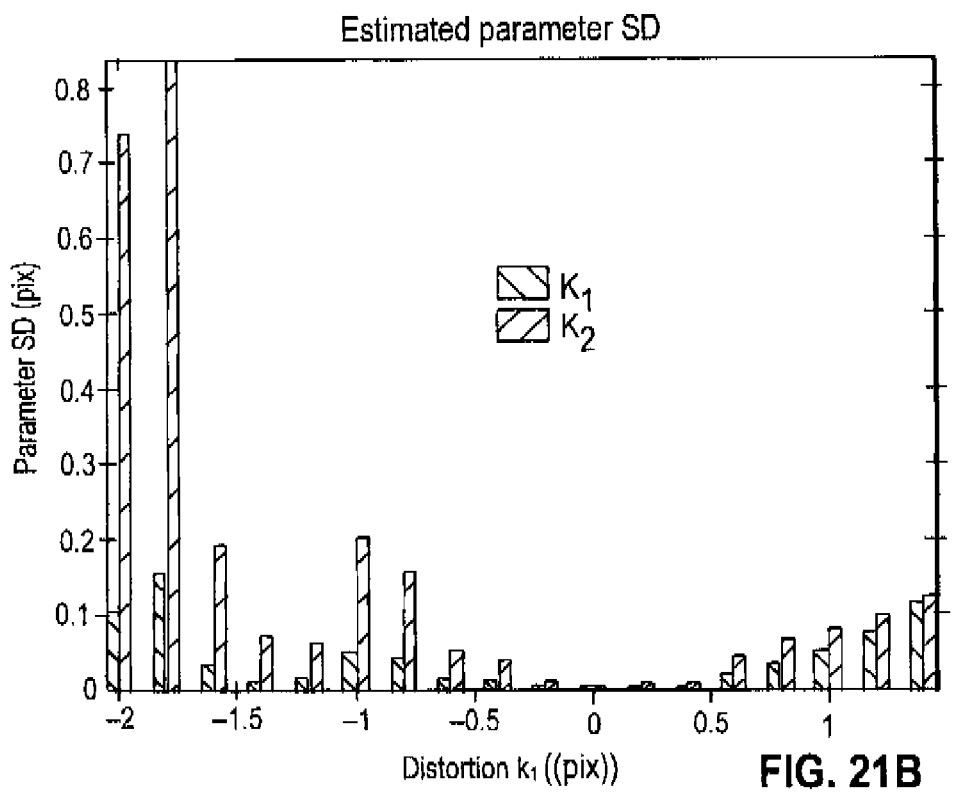
Figure 22A:
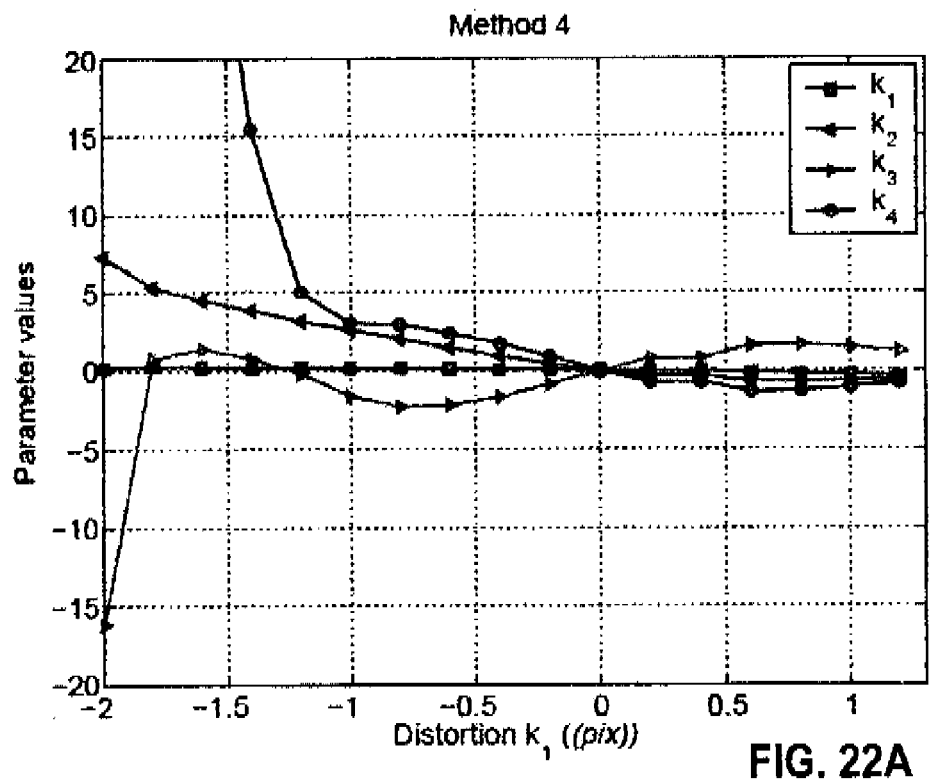
FIG. 22 illustrates mean and SD of parameters values for Method 4 over the 100 randomly chosen control point locations.
Figure 22B:
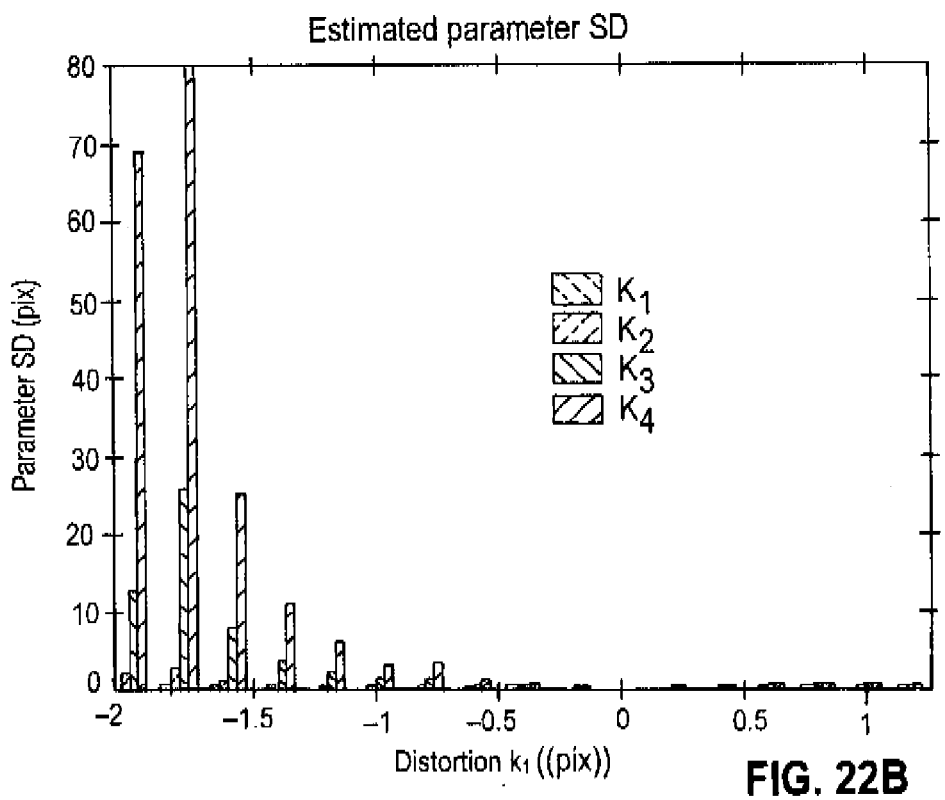
Figure 24:
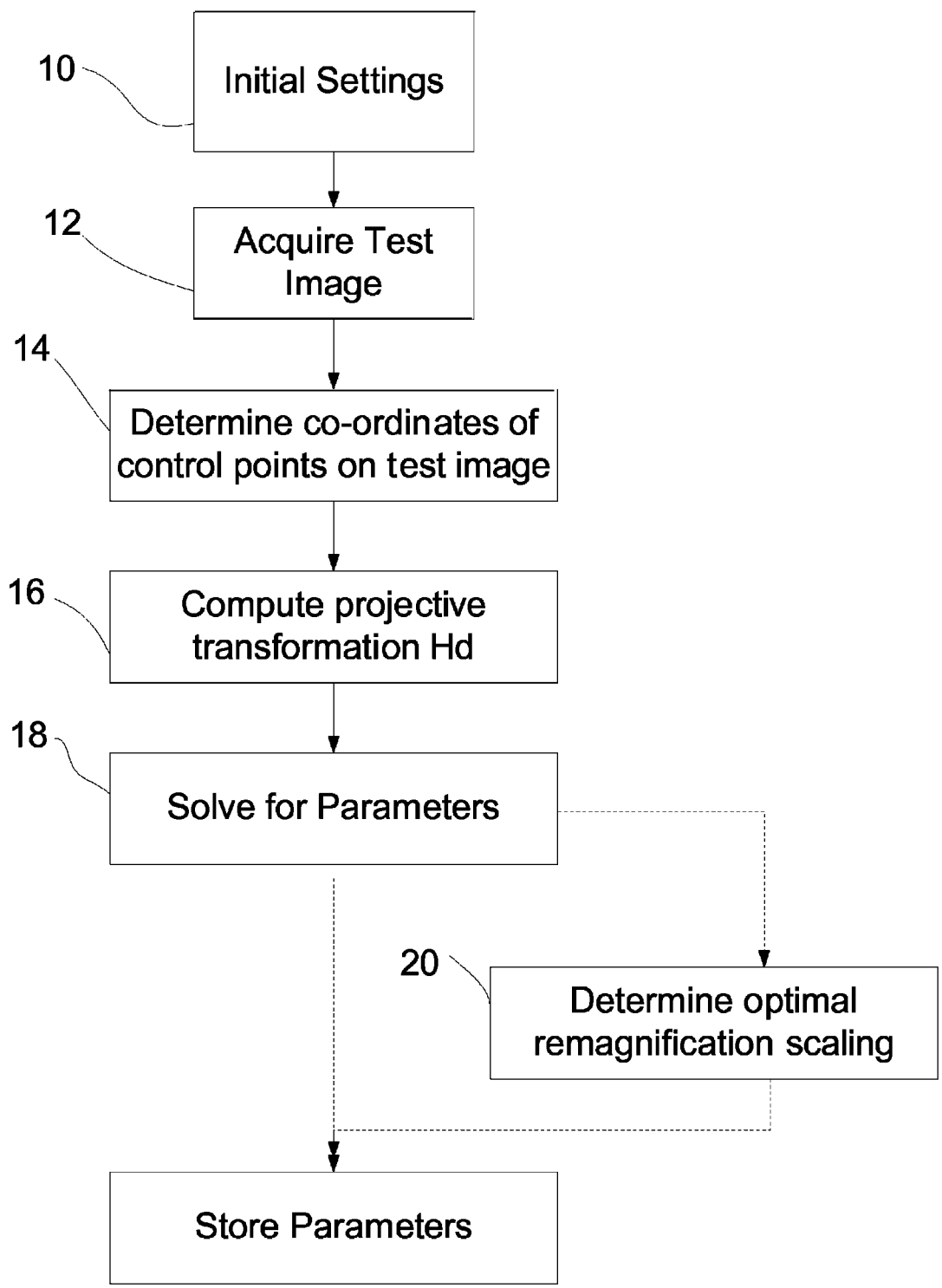
FIG. 24 is an exemplary process flow for determining the distortion parameters of Method 1.
Figure 25:
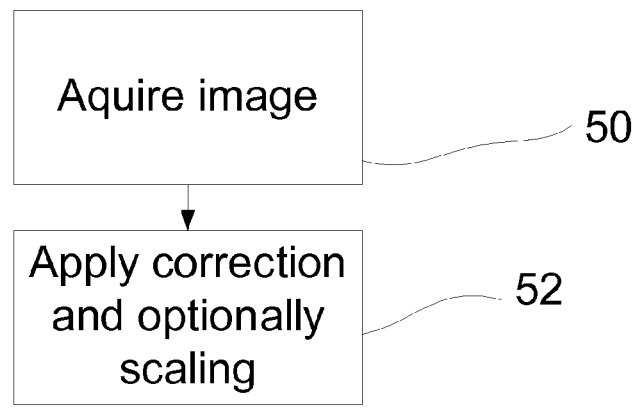
FIG. 25 is an exemplary process flow for correcting an image using the distortion parameters as determined from the Method of FIG. 24.

The accuracy of the four methods are compared in FIG. 17. The ability to correctly distort a model is primarily linked with the underlying distortion model. As FIG. 17 shows, the reverse model in Method 3 and 4 is more unstable than the forward model used in Method 1 and 2. Method 4 is shown to be highly dependent on the location of the control points. Method 1 outperforms all other methods with much lower distortion residuals, indicating that the proposed algorithm is not dependent on the location of control points and its use of a higher order model than Method 2 does not lead to instabilities.

Each method involves estimating the distortion center. FIG. 18 illustrates the x and y errors for the estimated center point for the four methods over 100 random placements of the calibration data and subject to varying distortion. This shows that the center point in the line based method is quite sensitive to the location of the calibration data. The performance of Methods 2 and 3 are roughly similar (excluding the peak errors at $k_1=0.01$ for Method 3). The method of the present invention shows a very low center point error in comparison. This demonstrates the high stability of the algorithm and the high accuracy afforded by the use of an appropriate distortion model.

The parameter values and standard deviations of each method are shown in FIGS. 19-22. These show the variation of the parameters with distortion and their integrity with respect to varying control point positions. As expected, the present method and method 2 which employ forward distortion models show bounded parameter values. In contrast, the parameter values for methods using the reverse model are much larger. The line based method shows large parameter and SD values, indicating in conjunction with its poor residual accuracy that this algorithm fails to converge for many of the position samples.

The proposed algorithm is compared with the three alternative methods for robustness to noise in control point positions. The 3D position of the control points are fixed throughout. For each simulated distortion level, noise with a distribution of $N(0, \sigma^2)$ is added for 100 samples. The noise variance $\sigma^2$ is then varied through $0 \rightarrow 1$ (pix). As this generates a significant quantity of data, only the residual distortion is presented, for the range of barrel distortion only.

The residual errors are presented in FIGS. 4-7. FIG. 4 presents the residual results for the proposed method, (Method 1). It can be noted from these results that for zero distortion levels, a larger residual error is induced than for the other distortion levels. This is due to the incorrect classification of noise in the data as actual distortion. Excluding this zero level distortion, the residual SD increases in direct proportion with the induced noise. All residuals remain in the subpixel range. It can be confidently concluded that the proposed algorithm copes successfully with noise.

In comparison, Method 2 shows a larger residual error. As this method also uses the forward model of distortion, its increase in error is proportional with the increase in noise variance. Method 3 uses the reverse model of distortion, and the results in FIG. 6 show that the residual error is larger than that of Method 2. However, in terms of robustness to noise, the algorithm appears to cope successfully. The final line based method, Method 4, also uses the reverse model, but to a higher order. The high order reverse model has been shown to have instability tendencies, so the increase in noise levels induces a large increase in residual error. Indeed for some samples, the algorithm failed to converge and in others, convergence is questionable.

The comparison of the present method with the line based method shows a very considerable improvement. The line based method fails to reach this performance despite using a high order model. One reason for this is that no geometric relationship exists between the objective error and the distortion. The ill conditioning induced by the reverse model at high distortion levels hampers its performance further, all culminating in the tendency to lodge in local minima and in some cases fail to converge due to singularities in the estimation moment or co-factor matrix. The poor estimation performance may be additionally observed in the widely varying estimates for the center of distortion. It is not suitable for larger distortion levels.

In comparison with the full calibration technique of Method 3, the proposed technique shows a significant performance increase. This method used the reverse model and hence failed to achieve comparable residual results. This algorithm is restricted to low levels of distortion as an increase in distortion model order would lead directly to increased sensitivity and ultimately poorer performance. The side-by-side analysis with the full calibration technique of Method 2, primarily indicates the proposed method achieves smaller residual error. This may be expected as both techniques use the forward distortion model, only to a higher order in Method 1. Despite the use of this higher order model, no adverse consequences arise from its use such as instabilities in the estimation problem. Actually, the comparisons on the recovered centers of distortion show that the proposed method achieves far superior stability in its estimation than Method 2.

The experiments conducted on simulated data clearly show that the proposed algorithm outperforms the comparison techniques on an accuracy front. The improvement in accuracy may be attributed to the use of an appropriate distortion model, the estimation algorithm still performs equally as well as the methods that require multiple inputs of data points. The simulations also show that the proposed algorithm at least matches the stability of full calibration methods, and surpasses them in many cases such as in the estimation of the distortion center. In summary, it is shown to be suitable for distortion levels of all kinds, with good invariance to control point location and noise.

Comparisons on real data are compiled with seven different samples of distortion, arranged in increasing order. FIG. 8 gives a brief description of the camera type and image resolution of each sample. Three images were input into the full calibration techniques of Methods 2 and 3, while the first of these was used in the single image methods. As an example, sample number 5 from this data set is shown in FIG. 9. One additional image is used for the residual distortion evaluation of all four methods. These residuals are compiled, with one exception, by undistorting the evaluation image and estimating a radially weighted homography on this data. The residuals for the line based Method 4 are compiled directly by undistorting the data. A radially weighted homography is then computed on these coordinates. This avoids the addition of extra inaccuracies through the use of an inverse approximation to undistort the image. All chessboard intersection points are estimated from an initial guess using the nonlinear line intersection method described in the accompanying additional information document, with a small local support in order to avoid the introduction of bias.

The number of iterations required for each method to converge is also presented in FIG. 8. This shows that there is a less computational overhead with the proposed method. It should also be noted that no optimization is conducted within the Gauss-Newton method (used by Method 1), unlike the comparison methods which use a combination of a Gradient Decent and Gauss-Newton (LM) to speed up convergence.

Firstly, each method is examined for the residual distortion remaining after correction. These residuals are presented in FIG. 10 in mean (SD).

Figure 12A:
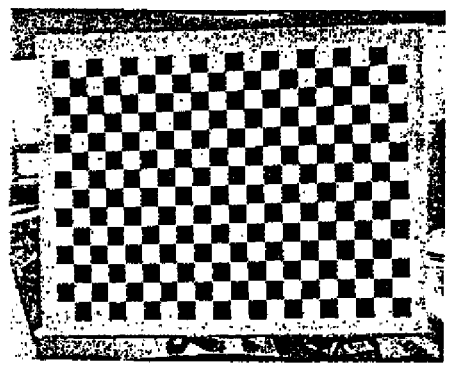
FIGS. 12A, 12B and 12C are corrected evaluation images.
Figure 12B:
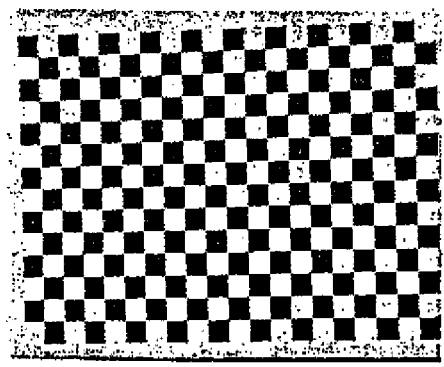
Figure 12C:
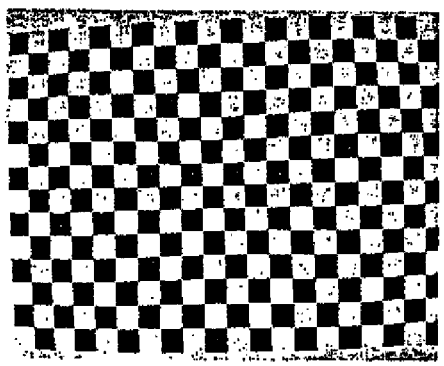
Figure 13:
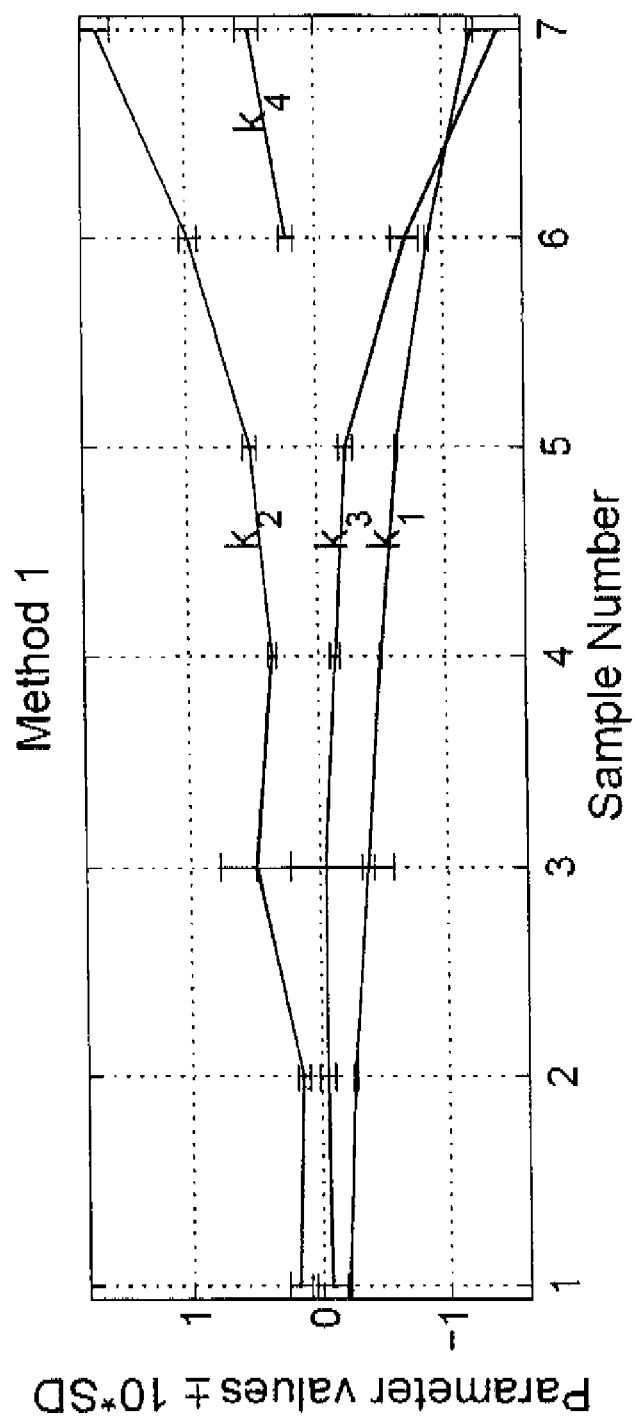
FIG. 13 illustrates Method 1 parameters with scaled 95% uncertainty bound.
Figure 14:
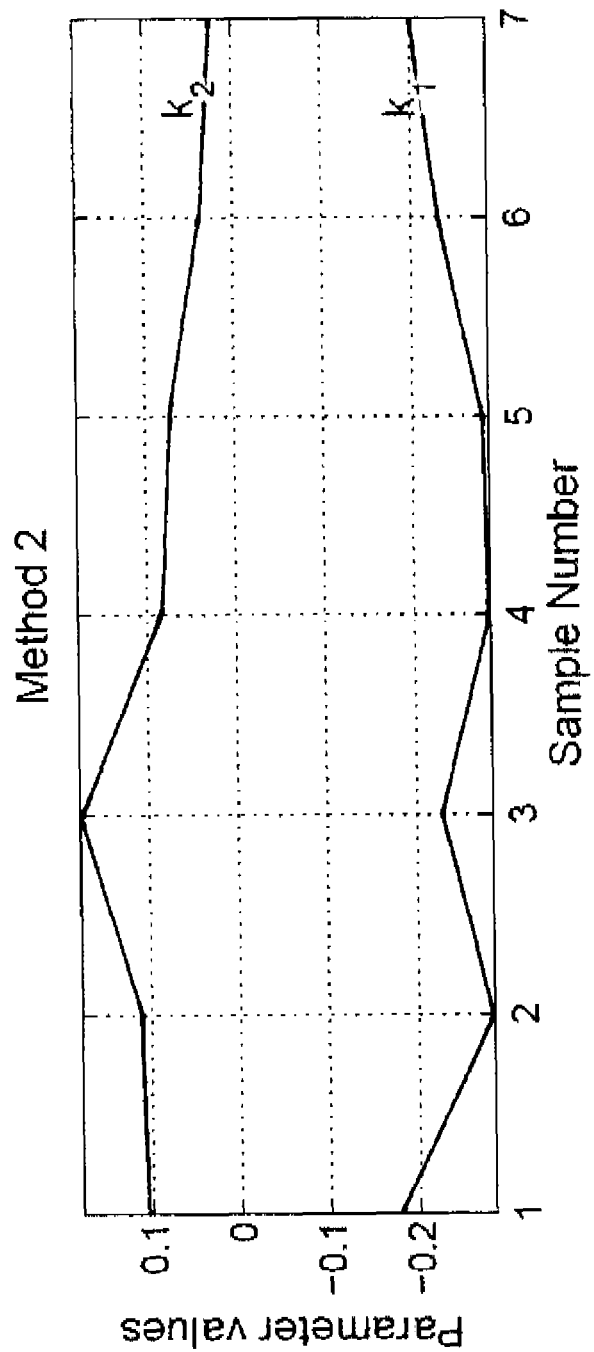
FIG. 14 illustrates Method 2 parameters.
Figure 15:
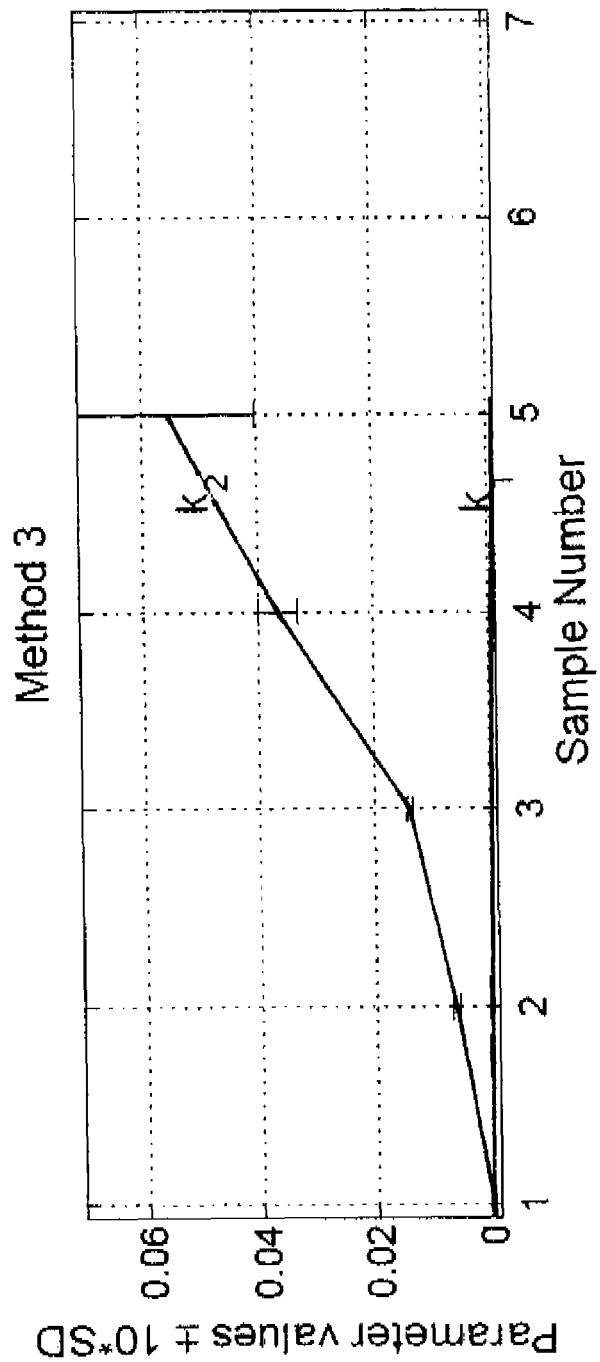
FIG. 15 illustrates Method 3 parameters with scaled 95% uncertainty bound.
Figure 16:
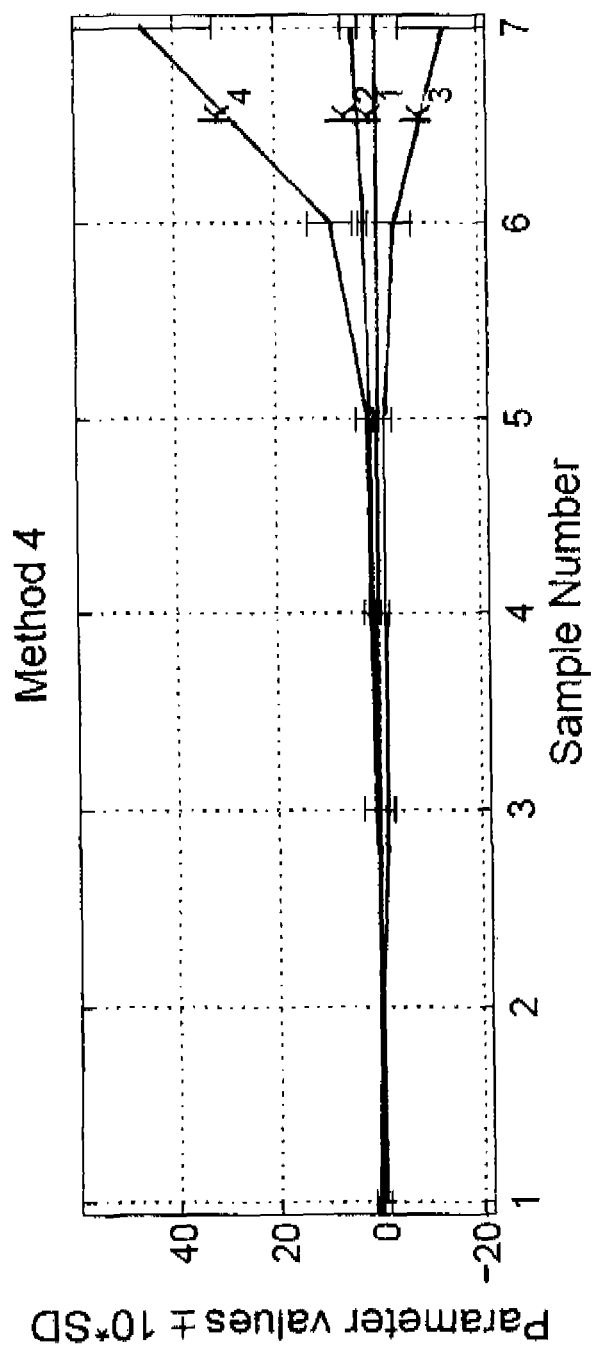
FIG. 16 illustrates Method 4 parameters with scaled 95% uncertainty bound.

FIG. 10 shows that the proposed method achieves a lower residual error than any of the comparison methods. Methods 3 and 4 show slightly erratic performances. As the improvement in performance of the proposed method may be attributable to the higher order model used, an extra comparison was conducted using a two parameter distortion model in Method 1. This is the same model as used in Method 2. The results are presented in FIG. 11 for comparison with those of Method 2. These results show that the proposed method still achieves an overall lower residual error. This comes despite the fact that Method 2 uses three times the amount of input data than Method 1 in these experiments. The undistorted images for Sample 5 are shown in FIGS. 12A, 12B and 12C. FIG. 12A shows Method 1, FIG. 12B shows Method 2 and FIG. 12C shows Method 3. A residual distortion is observable in the image undistorted with Method 3.

The values and uncertainties of each estimated parameter is presented for Methods 1-4 in FIGS. 13-16 respectively. Method 4 shows as expected large parameter values and uncertainty for larger distortion levels. Method 3, using a two parameter version of the reverse model, exhibits a similar trend, only with a lower magnitude. Method 2, using a two parameter version of the forward model, shows bounded values. Method 1 also shows bounded parameter magnitudes with small error bands. This confirms the results obtained on simulated data, and indicates the suitability of a high order forward model for distortion calibration.

The estimates of the distortion center for each method are presented in FIG. 23. These show that Method 1 recovers the center point very close to that of the full calibration Method 2. This indicates a close relationship between the center point of distortion and the principal point (as recovered by Method 2). Method 3 recovers a similar principal point except in the samples where the distortion is poorly modeled, e.g. sample no. 5.

Following the results obtained with simulated data, the experiments with real images aim to confirm these findings. In this sense, Method 4 is shown to have erratic accuracy and a tendency for high uncertainty in its parameters. In comparison, Method 1 significantly improves upon the performance of Method 3, from a distortion removal point of view. As in the simulated case, there is also a clear improvement in the accuracy of Method 1 in comparison with Method 2.

It was slightly unclear if the proposed algorithm would match the performance of Method 2 using a lower order distortion model. This was investigated with the comparison of both methods using the same distortion model. It revealed that on average Method 1 achieved a slightly lower distortion residual. This indicates the robustness of the proposed approach, considering that Method 2 uses, in this case, three times the amount of input data. The center point is reliably estimated, with very similar locations to that of the full calibration techniques that require more than one image for its recovery. However, this is not the case for the line based Method 4, which shows unreliable center point estimates.

In conclusion, the experiments with real and simulated data clearly demonstrate that the present method outperforms all comparison methods in terms of accuracy in calibrating and removing distortion. This level of accuracy is achieved while using less input data, requiring only one view. The parameter estimates are shown to be reliable, and lend themselves to a well conditioned problem. Additionally, the real experiments show that there is less computational overhead than the comparison methods. These factors in combination with the more accessible closed form solution, appropriate distortion modeling and unique minimization of pixel distortions in resampling, make this method a highly suitable non-metric method for removing lens distortion of all levels in perspective camera.

A novel aspect of this approach is the formulation to recover the previously unknown projections of the true undistorted coordinates of the particular calibration object. This allows the objective derivatives to be readily computed and estimated using standard non-numerical techniques. A unique feature of the formulation is its ability to model decentering distortion of lens assemblies without its explicit parametric inclusion. The basic idea may be visualized as a 'planarity of planes' approach in contrast to the 'straightness of lines' method.

Secondly, a new idea is proposed to optimally form a new aberration free image in order to reduce the unavoidable resampling distortions such as stretching and shearing. The end result is that the new image contains less noise than an unoptimized image, while also having a wider field of view for normal barrel lens distortion.

Due to the new formulation of the problem, certain key advantages are gained over the existing collection of solutions. The forward model of lens distortion is used, in comparison with other nonmetric approaches which are forced to use the reverse model or a variation, and cannot avail of its advantages. Decentering distortion is naturally modeled by the particular formulation without the need for additional parameters. The precision to which lens distortion may be modeled and removed is very high. The accuracy is shown to outperform other alleged nonmetric approaches and, match and often outperform the performance of complete bundle adjustment methods. In addition to this accuracy, the distortion calibration is shown to be very stable unlike many nonmetric alternatives. This precision and stability is not limited to a small domain of lens distortions, but effectively covers all possible or practical levels of lens distortions in perspective cameras, from very low focal lenses such as fish-eye, to very high focal length lenses. In contrast, alternative full calibration and nonmetric methods are only suited to mild levels of distortion.

Complete calibration methods, and their associated relative complexity are not suitable for all applications. Many situations exist wherein only the nonlinear distortion calibration is required. The current means of calibrating distortion only relies on existing nonmetric approaches. These algorithms are not without their own complexity, involving a cumbersome phase of line segmentation and recovery. In contrast the proposed method utilizes the existing relatively straightforward planar detection methods associated with full calibration methods. Only one view of this planar target is required to completely solve the problem. The two constraints that are imposed on the target, that of planarity and known structure up to scale (these constraints, and more, apply to the full calibration methods), are easily attained.

The distortions introduced during the removal of lens distortion through interpolation are also considered for the first time. This is an integral part of the distortion calibration process if undistorted images are the desired end result. These optimized images contain less noise and retain more pixel information.

The different elements of the process will now be explained with reference to an exemplary calibration process which is employed initially. The data obtained from the calibration step is subsequently employed in the correction process.

The calibration process comprises a series of steps, as illustrated in the process flow of Figure ?. The initial step comprises the setting up of the imaging apparatus such as a camera in a test configuration. The camera may be set up on a tripod or other support and directed at a reference (e.g. chessboard) image. As will be explained below, the reference object is suitably selected to simplify the subsequent processing of the data. The reference object is positioned a distance away from camera. However as explained above this is not critical but merely requires the target to be fully encompassed with the image.

As, a measure of distortion is being obtained it is important to capture an image of a specific known target so that the method attempts to correct the captured image appropriately in determining the model. Thus the reference object (target) is suitably selected to facilitate the subsequent image analysis aspect of the calibration process. An example of a suitable reference object is a planar surface with a checkerboard pattern defined thereon. A checkerboard pattern is suitable since the positions of the corners of the individual squares may readily be identified using conventional corner detection techniques. Suitably, the number of squares in the pattern would ensure that each square represented a pixel area in the image of x by x pixels, where x is suitably a value in the range of 40 to 200 pixels depending on the sensor size to meet the minimum number of control points required.

Once the camera, lens and target have been appropriately set up, an image is acquired by the camera and the mathematical methods described above applied to determine the appropriate parameters for a correction model. This correction model, as will be appreciated from above, allows for correction to be applied to any subsequent images captured by the imaging system.

Other ways of implementation apply as long as the elements of the present invention are included.

In addition to the description of specific, non-limited examples of embodiments of the invention provided herein, it should be appreciated that the invention can be implemented in numerous other applications involving the different configurations of video-processing equipment. Although the invention is described hereinbefore with respect to illustrative embodiments thereof, it will be appreciated that the foregoing and various other changes, omissions and additions in the form and detail thereof may be made without departing from the spirit and scope of the invention.

What is claimed is:

1. A method for determining lens distortion parameters for an imaging system comprising a lens and an imaging device, the method comprising:
    capturing an image of a target with a known structure through the lens, the target comprising a known, two-dimensional, planar structure comprising a plurality of control points;
    detecting the positions of the plurality of control points in the captured image,
    performing a Euclidean transform on detected control points,
    calculating an estimate for the positions of the control points without distortion through a projective transformation of their known structure in conjunction with a distortion model applied to these estimated control points to provide an estimated location for distorted control points,
    comparing these estimated locations to the Euclidean transformed detected control points while simultaneously refining estimated positions through the projective transformation, the distortion model and the Euclidean transform of the measured control point coordinated, to minimize the difference, and
    storing the distortion model once the difference has been minimized.

2. A method according to claim 1, wherein the target includes a checkerboard pattern and the plurality of control points are the corners of the squares.

3. A method according to claim 1, further comprising applying the distortion model with stored model parameters to correct a further captured image to produce an undistorted image.

4. A method according to claim 3, further comprising scaling the captured image.

5. A method according to claim 4, wherein the degree of scaling is determined directly from the distortion model to minimize average pixel stretch throughout the image.

6. A method for determining lens distortion parameters for an imaging system comprising a lens and an imaging device, the method comprising:
    capturing an image of a target with a known structure through the lens, the target comprising a known, two-dimensional, planar structure comprising a plurality of control points;
    detecting the positions of the plurality of control points in the captured image,
    estimating positions of detected control points without distortion by applying a Euclidean transform to detected values in conjunction with a distortion model applied to the Euclidean transformed detected values,
    comparing these estimated points without distortion to the estimated positions of the control points without distortion obtained through projective transformation of their known structure and adjusting parameters of the distortion model, Euclidean transform and estimated values to minimize the difference, and
    storing the distortion model once the difference has been minimized.

7. A method according to claim 6, wherein the target includes a checkerboard pattern and the plurality of control points are the corners of the squares.

8. A method according to claim 6, further comprising applying the distortion model with stored model parameters to correct a further captured image to produce an undistorted image.

9. A method according to claim 8, further comprising scaling the captured image.

10. A method according to claim 9, wherein the degree of scaling is determined directly from the distortion model to minimize average pixel stretch throughout the image.

11. A method for determining lens distortion parameters for an imaging system comprising an imaging device and lens, the method comprising:
    capturing an image of a target through the lens, the target comprising a known, two-dimensional, planar structure comprising a plurality of control points;
    detecting the positions of the plurality of control points in the captured image, transforming detected positions of the control points into a lens centric coordinate system using a Euclidean Transform and initial transformation values;
    computing an estimate for the positions of the control points without distortion in conjunction with a distortion model applied to estimated control points to provide an estimated location for distorted control points; and
    comparing and simultaneously refining estimated positions, the parameters of the distortion model and the initial transformation values to minimize the difference between the estimated positions of the control points and the Euclidean transformed detected positions of the control points, and storing distortion model parameters once the difference has been minimized.

12. A method according to claim 11 wherein the target includes a checkerboard pattern and the plurality of control points are the corners of the squares.

13. A method according to claim 11, further comprising applying the distortion model with the stored model parameters to correct a further captured image to produce an undistorted image.

14. A method according to claim 13, further comprising scaling the captured image.

15. A method according to claim 14, wherein the degree of scaling is determined directly from the distortion model to minimize average pixel stretch throughout the image.

16. An imaging system comprising a lens and an imaging device, wherein the system is adapted to perform the method of claim 11.

17. An imaging system according to claim 16, wherein the imaging system is a camera and the imaging device is a sensor.

18. A camera according to claim 17, wherein the sensor is a CCD device.

19. An imaging system according to claim 18, wherein the imaging system is a projector.

20. A projector according to claim 19, wherein the imaging device is a LCD device.

* * * * *